United States Patent
Fujita et al.

(10) Patent No.: US 8,761,386 B2
(45) Date of Patent: Jun. 24, 2014

(54) SOUND PROCESSING APPARATUS, METHOD, AND PROGRAM

(75) Inventors: Noriaki Fujita, Chiba (JP); Jun Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 175 days.

(21) Appl. No.: 13/330,083

(22) Filed: Dec. 19, 2011

(65) Prior Publication Data

US 2012/0163580 A1 Jun. 28, 2012

(30) Foreign Application Priority Data

Dec. 24, 2010 (JP) ................................. P2010-287450

(51) Int. Cl.
*H04M 9/08* (2006.01)
(52) U.S. Cl.
USPC .................................. 379/406.08; 379/406.1
(58) Field of Classification Search
CPC ...... H04M 9/082; H04M 1/2535; H04B 3/23; H04B 3/234; H04B 3/231
USPC ............ 379/406.01–406.16; 381/71.1–71.14, 381/94.1–94.9; 370/286–296; 455/570
See application file for complete search history.

(56) References Cited

U.S. PATENT DOCUMENTS

| | | | | |
|---|---|---|---|---|
| 6,243,462 | B1* | 6/2001 | Chujo et al. | 379/406.1 |
| 6,445,792 | B1* | 9/2002 | Shiraki et al. | 370/286 |
| 8,315,380 | B2* | 11/2012 | Liu | 379/406.08 |
| 2007/0092074 | A1* | 4/2007 | Takada | 379/406.08 |
| 2009/0257579 | A1* | 10/2009 | Takada | 379/406.08 |

FOREIGN PATENT DOCUMENTS

JP 9-247246 9/1997

* cited by examiner

*Primary Examiner* — Fan Tsang
*Assistant Examiner* — Akelaw Teshale
(74) *Attorney, Agent, or Firm* — Sony Corporation

(57) ABSTRACT

A sound processing apparatus includes: a sound output unit which outputs sound based on a first sound signal as first sound processing when execution of the first sound processing is instructed; a sound collecting unit which generates an echo signal by collecting surrounding sound; a filtering unit which performs filtering process with an adaptive digital filter on the first sound signal and generates a pseudo echo signal; a subtracting unit which removes a sound component, which is output from the sound output unit and reaches the sound collecting unit, from the echo signal by subtracting the pseudo echo signal from the echo signal to generate a residual signal; an updating unit which updates the adaptive digital filter based on the residual signal and the first sound signal; and an update resolution control unit which controls the resolution at which the adaptive digital filter is updated by the updating unit.

20 Claims, 19 Drawing Sheets

SOUND PROCESSING APPARATUS, METHOD, AND PROGRAM

BACKGROUND

The present disclosure relates to a sound processing apparatus, a method, and a program, and particularly to a sound processing apparatus, a method, and a program which are preferably used when an acoustic echo is cancelled.

In the related art, an acoustic echo canceller which removes an echo by combining acoustics of a speaker's voice in a video telephone or the like is used. According to the video telephone, for example, not only the voice of the speaker but also the voice of a counterpart of the telephone call, which is output by a speaker, is collected when the speaker's voice is collected in order to transmit the voice to the counterpart of the telephone call. Therefore, such voice (acoustic echo) of the counterpart of the telephone call is removed by an acoustic echo canceller.

Specifically, a filtering process with the use of an adaptive digital filter is performed on the voice of the counterpart of the telephone call, which is to be output by the speaker, and a pseudo echo signal as an estimation result of the voice of the counterpart of the telephone call, which is collected by a microphone, is generated. A residual signal which is obtained by subtracting the pseudo echo signal from the voice actually collected by the microphone is transmitted as the voice of the speaker to the counterpart of the telephone call.

At this time, filter coefficients of the adaptive digital filter are continually updated with the use of the received voice of the counterpart of the telephone call and the residual signal in the acoustic echo canceller in order to enhance the precision in the estimation of the collected voice of the counterpart of the telephone call.

If such an acoustic echo canceller is applied to an actual video telephone, the echo length in a room is as long as several hundreds of msec depending on the installation environment, and therefore, it is necessary to prepare several thousand filter taps for the echo length, which involves extensive computations. In addition, since it takes a long time for the values of the filter coefficients to converge, a sufficient degree of echo suppression is not obtained immediately after the start of the telephone call. That is, the acoustic echo is not sufficiently removed immediately after the start of the telephone call.

Thus, a learning method has been proposed in which filter coefficients are made to more rapidly converge after the start of a telephone call by causing a speaker to output a training signal such as a white noise or the like prior to the telephone call and collecting the voice to update the filter coefficients (see Japanese Unexamined Patent Application Publication No. 9-247246, for example).

SUMMARY

According to the aforementioned technique, however, the start of the telephone call is delayed due to learning of the filter coefficients. Moreover, it is also necessary to perform an extensive amount of computations for learning. Furthermore, white noise or the like output by the speaker during learning is disagreeable to the ears of the speaker.

It is desirable to make it possible to more rapidly obtain appropriate filter coefficients without delaying the start of the sound processing such as a telephone call or the like.

According to a first embodiment of the present disclosure, there is provided a sound processing apparatus including: a sound output unit which outputs sound based on a first sound signal as first sound processing when execution of the first sound processing is instructed; a sound collecting unit which generates an echo signal by collecting surrounding sound; a filtering unit which performs filtering process with the use of an adaptive digital filter on the first sound signal and generates a pseudo echo signal; a subtracting unit which removes a sound component, which is output from the sound output unit and reaches the sound collecting unit, from the echo signal by subtracting the pseudo echo signal from the echo signal to generate a residual signal; an updating unit which updates the adaptive digital filter based on the residual signal and the first sound signal; and an update resolution control unit which controls the resolution at which the adaptive digital filter is updated by the updating unit, wherein the sound output unit outputs sound based on a second sound signal as second sound processing when execution of the second sound processing which is different from the first sound processing is instructed after the first sound processing, wherein the filtering unit generates the pseudo echo signal by performing the filtering process on the second sound signal with the use of the adaptive digital filter, which has been updated by the updating unit for the first sound processing, in the second sound processing, and wherein the subtracting unit generates the residual signal used in the second sound processing by subtracting the pseudo echo signal from the echo signal in the second sound processing.

The update resolution control unit may calculate a degree of echo suppression based on the echo signal and the residual signal and increase or reduce the update resolution based on the degree of echo suppression.

The update resolution control unit may increase the update resolution when the degree of echo suppression is less than a predetermined threshold value.

The update resolution control unit may increase the update resolution by a predetermined value when the computation capacity which can be newly processed by a control apparatus realizing the updating unit is equal to or greater than a preset value, and the update resolution control unit may increase the update resolution by a value which is less than the predetermined value when the computation capacity is less than the preset value, if the degree of echo suppression is less than the threshold value.

The update resolution control unit may reduce the update resolution when the degree of echo suppression is equal to or greater than a predetermined threshold value.

The first sound processing may be processing of reproducing content, and the second sound processing may be processing of communicating with a counterpart.

The first sound processing may be route guide processing by sound, and the second sound processing may be processing of communicating with a counterpart.

The update resolution control unit may increase or reduce the update resolution in accordance with the degree of similarity between the pseudo echo signal and the residual signal or the degree of similarity between the echo signal and the residual signal.

The update resolution control unit may reduce the update resolution or stop the updating of the adaptive digital filter when a current state is detected to be in a double-talk state.

According to a first embodiment of the present disclosure, there are provided a sound processing method and a program causing a sound output unit to output sound based on a first sound signal as first sound processing when execution of the first sound processing is instructed; causing a sound collecting unit to generate an echo signal by collecting surrounding sound; performing filtering process with the use of an adaptive digital filter on the first sound signal to generate a pseudo echo signal; removing a sound component, which is output from the sound output unit and reaches the sound collecting unit, from the echo signal by subtracting the pseudo echo signal from the echo signal to generate a residual signal; updating the adaptive digital filter based on the residual signal and the first sound signal; controlling an update resolution of the adaptive digital filter; causing the sound output unit to output sound based on a second sound signal as second sound processing when execution of the second sound processing which is different from the first sound processing is instructed after the first sound processing; generating the pseudo echo signal by performing the filtering process on the second sound signal with the use of the adaptive digital filter, which has been updated for the first sound processing, in the second sound processing; and generating the residual signal used in the second sound processing by subtracting the pseudo echo signal from the echo signal in the second sound processing.

According to the first embodiment of the present disclosure, a sound output unit is caused to output sound based on a first sound signal as first sound processing when execution of the first sound processing is instructed, a sound collecting unit is caused to generate an echo signal by collecting surrounding sound, filtering process with the use of an adaptive digital filter is performed on the first sound signal to generate a pseudo echo signal, a sound component, which is output from the sound output unit and reaches the sound collecting unit, is removed from the echo signal by subtracting the pseudo echo signal from the echo signal to generate a residual signal, the adaptive digital filter is updated based on the residual signal and the first sound signal, and an update resolution of the adaptive digital filter is controlled. In addition, the sound output unit is caused to output sound based on a second sound signal as second sound processing when execution of the second sound processing which is different from the first sound processing is instructed after the first sound processing, the pseudo echo signal is generated by performing the filtering process on the second sound signal with the use of the adaptive digital filter, which has been updated for the first sound processing, in the second sound processing, and the residual signal used in the second sound processing is generated by subtracting the pseudo echo signal from the echo signal in the second sound processing.

According to a second embodiment of the present disclosure, there is provided a sound processing apparatus including: a sound output unit which outputs sound based on a sound signal as first sound processing when execution of the first sound processing is instructed; a sound collecting unit which generates an echo signal by collecting surrounding sound; a filtering unit which performs filtering process with the use of an adaptive digital filter on the sound signal and generates a pseudo echo signal; a subtracting unit which removes a sound component, which is output from the sound output unit and reaches the sound collecting unit, from the echo signal by subtracting the pseudo echo signal from the echo signal to generate a residual signal; an updating unit which updates the adaptive digital filter based on the residual signal and the sound signal; and an update resolution control unit which controls the resolution at which the adaptive digital filter is updated by the updating unit, wherein the filtering unit generates the pseudo echo signal by performing the filtering process on the sound signal with the use of the adaptive digital filter, which has been updated by the updating unit for the first sound processing, when execution of the second sound processing which is different from the first sound processing is instructed during the execution of the first sound processing, and wherein reproduction control, volume control, or tonal control for the sound signal is performed based on the residual signal as the second sound processing.

According to the second embodiment of the present disclosure, a sound output unit outputs sound based on a sound signal as first sound processing when execution of the first sound processing is instructed, a sound collecting unit generates an echo signal by collecting surrounding sound, filtering process with the use of an adaptive digital filter is performed on the sound signal to generate a pseudo echo signal, a sound component, which is output from the sound output unit and reaches the sound collecting unit, is removed from the echo signal by subtracting the pseudo echo signal from the echo signal to generate a residual signal; the adaptive digital filter is updated based on the residual signal and the sound signal, and an update resolution of the adaptive digital filter is controlled. In addition, the pseudo echo signal is generated by performing the filtering process on the sound signal with the use of the adaptive digital filter, which has been updated for the first sound processing, when execution of the second sound processing which is different from the first sound processing is instructed during the execution of the first sound processing, and reproduction control, volume control, and tonal control for the sound signal are performed based on the residual signal as the second sound processing.

According to the first and second embodiments of the present disclosure, it is possible to more rapidly obtain appropriate filter coefficients without delaying the start of the sound processing.

DETAILED DESCRIPTION OF EMBODIMENTS

Hereinafter, embodiments to which the present disclosure is applied will be described with reference to the drawings.

First Embodiment

Configuration Example of Acoustic Echo Canceller

Figure 1:
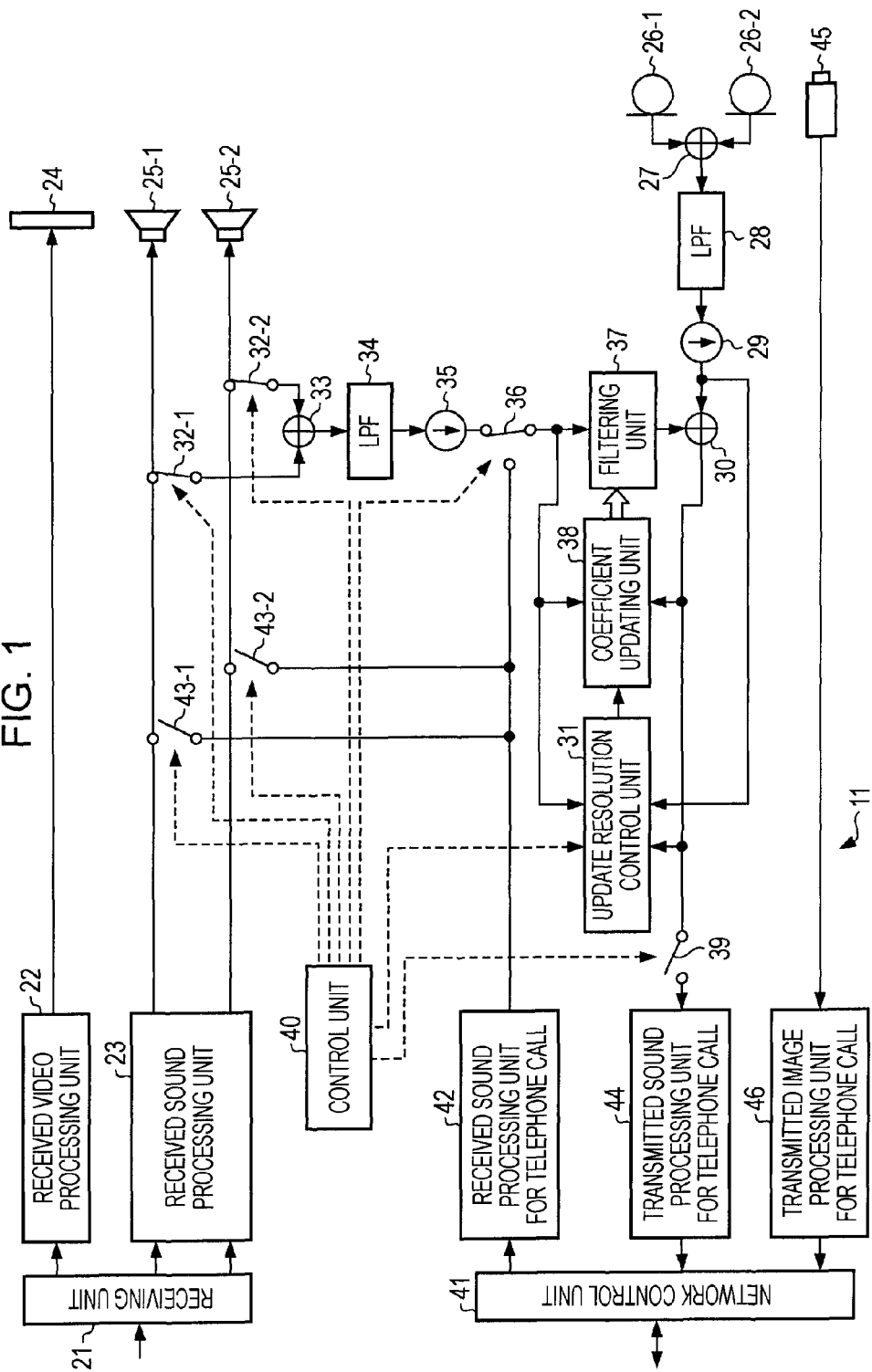
FIG. 1 is a diagram showing a configuration example of an acoustic echo canceller according to an embodiment to which the present disclosure is applied.

FIG. 1 is a diagram showing a configuration example of an acoustic echo canceller according to an embodiment to which the present disclosure is applied. This acoustic echo canceller 11 receives and reproduces a broadcasted television program, for example, and also functions as a video telephone.

That is, the receiving unit 21 of the acoustic echo canceller 11 receives a broadcasting wave broadcasted on a television and extracts a video signal and a sound signal constituting a program from the broadcasting wave. The receiving unit 21 supplies the extracted video signal to the received video processing unit 22 and supplies the extracted sound signal to the received sound processing unit 23.

The received video processing unit 22 decodes the video signal from the receiving unit 21, supplies the video signal to the display unit 24 such as a liquid crystal display or the like, and causes the display unit 24 to display the video. The received sound processing unit 23 decodes the sound signal supplied from the receiving unit 21, supplies the sound signal to speakers 25-1 and 25-2, and causes the speakers 25-1 and 25-2 to output the sound.

For example, the sound signal for the right channel is supplied to the speaker 25-1 while the sound signal for the left channel is supplied to the speaker 25-2. In addition, the speakers 25-1 and 25-2 are also simply referred to as speakers 25 when it is not necessary to distinguish the speakers 25-1 and 25-2 in particular.

The sound output by the speakers 25 as described above is reflected by a wall or object in a room where the acoustic echo canceller 11 is installed and collected by a microphones 26-1 and 26-2 as an echo component. The microphones 26-1 and 26-2 supply a signal obtained by collecting the surrounding sound (hereinafter, referred to as an echo signal) to an adder 27. In addition, the microphones 26-1 and 26-2 are also simply referred to as microphones 26 when it is not necessary to distinguish the microphones 26-1 and 26-2.

The echo signals output by the microphones 26 are added by the adder 27, changed into a monaural signal, subjected to filtering process by an LPF (Low Pass Filter) 28, and further down-sampled to a predetermined sampling frequency by a down sampler 29. The echo signals down-sampled by the down sampler 29 are supplied to a subtractor 30 and an update resolution control unit 31.

In the acoustic echo canceller 11, the sound signal output by the received sound processing unit 23 to the speakers 25-1 and 25-2 is also supplied to the adder 33 via the switches 32-1 and 32-2 at the time of the reproduction of a program.

The sound signals supplied from the switches 32-1 and 32-2 to the adder 33 are added by the adder 33, changed into a monaural signal, subjected to the filtering process by the LPF 34, and further down-sampled into a predetermined sampling frequency by a down sampler 35. Then, the sound signals output by the down sampler 35 are supplied to a filtering unit 37, a coefficient updating unit 38, and the update resolution control unit 31 via the switch 36. Herein after, the switches 32-1 and 32-2 are also simply referred to as switches 32 when it is not necessary to distinguish the switches 32-1 and 32-2.

The filtering unit 37 estimates the echo component, which is output by the speakers 25, passes through an environment around the acoustic echo canceller 11, and is then collected by the microphones 26, by performing the filtering process on the sound signal from the switch 36 with the use of filter coefficients of the adaptive digital filter, which is supplied from the coefficient updating unit 38. The filtering unit 37 supplies the pseudo echo signal obtained in the estimation to the subtractor 30. For example, the adaptive digital filter is an FIR (Finite Impulse Response) type digital filter, or the like.

The subtractor 30 subtracts the pseudo echo signal supplied from the filtering unit 37 from the echo signal supplied from the down sampler 29 to generate a residual signal and supplies the residual signal to the coefficient updating unit 38, the update resolution control unit 31, and the switch 39.

Here, the sound output by the speakers 25 and the other sound around the acoustic echo canceller 11 (hereinafter, also referred to as environmental sound) are input to the microphones 26. In addition, the pseudo echo signal is a signal of the estimated sound output by the speakers 25 and collected by the microphones 26. Therefore, the residual signal obtained by removing (subtracting) the pseudo echo signal from the echo signal can be regarded as an estimation result of the environmental sound.

The update resolution control unit 31 generates update resolution information indicating the filter coefficient update resolution based on the computation resource information supplied from the control unit 40, the sound signal from the switch 36, the echo signal from the down sampler 29, and the residual signal from the subtractor 30 and supplies the update resolution information to the coefficient updating unit 38.

Here, the computation resource information is information indicating the computation capacity which can be newly processed at the current time point by a control apparatus realizing the coefficient updating unit 38, which is not shown in the drawing. The coefficient updating unit 38 updates the filter coefficients at the resolution in accordance with the update resolution information supplied from the update resolution control unit 31, based on the sound signal from the switch 36 and the residual signal from the subtractor 30.

Moreover, the acoustic echo canceller 11 is provided with a function as a video telephone. That is, a network control unit 41 transmits and receives IP (Internet Protocol) packets with an apparatus (hereinafter, also referred to as a far end) of the counterpart of the telephone call via a communication network and a base station which are not shown in the drawing. The IP packets received by the network control unit 41 accommodate the sound signal and the video signal from the counterpart of the telephone call.

The network control unit 41 supplies the sound signal extracted from the IP packets to the received sound processing unit 42 for a telephone call, supplies the video signal extracted from the IP packets to the display unit 24 via the received video processing unit for a telephone call which is not shown in the drawing, and causes the display unit 24 to display the video.

The received sound processing unit 42 for a telephone call decodes and outputs the sound signal supplied from the network control unit 41. The sound signal output by the received sound processing unit 42 for a telephone call is supplied to the speakers 25-1 and 25-2 via the switches 43-1 and 43-2 and supplied to the filtering unit 37, the coefficient updating unit 38, and the update resolution control unit 31 via the switch 36. Hereinafter, the switches 43-1 and 43-2 are also simply referred to as switches 43 when it is not necessary to distinguish the switches 43-1 and 43-2.

The control unit 40 supplies the computation resource information to the update resolution control unit 31. In addition, the control unit 40 turns on the switches 32, connects the switch 36 to the down sampler 35, and turns off the switches 43 and the switch 39 during the reproduction of the broadcasted television program.

Moreover, the control unit 40 turns off the switches 32, connects the switch 36 to the received sound processing unit 42 for a telephone call, and turns on the switches 43 and the switch 39 during the telephone call using the video telephone function. Accordingly, the sound signal from the received sound processing unit 42 for a telephone call is supplied to the filtering unit 37, the coefficient updating unit 38, and the update resolution control unit 31 via the switch 36, and the updating of the filter coefficients and the generation of the pseudo echo signal are performed with the use of the sound signal in this case.

The transmitted sound processing unit 44 for a telephone call encodes the residual signal supplied from the subtractor 30 via the switch 39 as a sound signal of the sound generated by the user (hereinafter, also referred to as the near end) who owns the acoustic echo canceller 11 and supplies the encoded sound signal to the network control unit 41.

The camera 45 captures an image of the user at the near end and supplies the video signal obtained as a result to the transmitted image processing unit 46 for a telephone call. The transmitted image processing unit 46 for a telephone call encodes the video signal from the camera 45 and supplies the video signal to the network control unit 41.

The network control unit 41 stores the sound signal from the transmitted sound processing unit 44 for a telephone call and the video signal from the transmitted image processing unit 46 for a telephone call in the IP packets and transmits the sound signal and the video signal to the apparatus at the far end via the communication network or the like which is not shown in the drawings.

[Description of Acoustic Echo Canceling Processing]

Incidentally, the acoustic echo canceller 11 starts the acoustic echo canceling processing and reproduces a designated program when the user instructs the reproduction of the broadcasted television.

In such acoustic echo canceling processing, the sound signal of the program is used to perform learning of the filter coefficients of the adaptive digital filter during the reproduction of the program. Then, when the user instructs the telephone call using the video telephone, the telephone call with the far end is performed, the filter coefficients obtained in learning are used to cancel the acoustic echo, and the sound without the acoustic echo is transmitted to the far end during the telephone call.

Hereinafter, the acoustic echo canceling processing by the acoustic echo canceller 11 will be described with reference to the flowchart in FIG. 2.

In Step S11, the acoustic echo canceller 11 performs prior learning processing. In the prior learning processing, a received program is reproduced, and the sound signal of the program is used for learning of the filter coefficients.

When the user operates the acoustic echo canceller 11 and instructs the start of the telephone call using the video telephone during the reproduction of the program, the processing proceeds from Step S11 to Step S12. In addition, the prior learning processing will be described in detail later.

In Step S12, the control unit 40 controls each switch of the acoustic echo canceller 11 to switch the output of the information.

For example, the control unit 40 turns off the switches 32, connects the switch 36 to the received sound processing unit 42 for a telephone call, and turns on the switches 43 and the switch 39. In so doing, the telephone call using the video telephone becomes possible.

In Step S13, the acoustic echo canceller 11 performs the telephone call processing and completes the acoustic echo canceling processing. In addition, the telephone call using the video telephone is performed, and the filter coefficients obtained in the prior learning processing are used to perform the processing of canceling the acoustic echo in the telephone call processing, which will be described later in detail.

As described above, the acoustic echo canceller 11 learns the filter coefficients in advance with the use of the sound signal of the program being reproduced before the telephone call processing by the video telephone for which the processing of canceling the acoustic echo is performed.

Accordingly, it is possible to start the canceling of the acoustic echo with the use of the filter coefficients which are more appropriate to the environment around the acoustic echo canceller 11 without delaying the start of the telephone call processing when the telephone call processing is actually performed. Therefore, it is possible to allow the filter coefficients to more rapidly converge with a lower computation capacity after the start of the telephone call processing. In addition, since the sound signal of the program being reproduced is used for learning the filter coefficients, the user does not feel the sound disagreeable to the ears unlike in the case of using white noise or the like for learning.

[Description of Prior Learning Processing]

Next, description will be made of the prior learning processing corresponding to the processing in Step S11 in FIG. 2 with reference to the flowchart in FIG. 3. In addition, the switches 32 are turned on, the switch 36 is connected to the down sampler 35, and the switches 43 and the switch 39 are in the off state at the time of the start of the prior learning processing.

In Step S41, the receiving unit 21 receives the broadcasting wave and supplies the video signal and the sound signal included in the broadcasting wave to the received video processing unit 22 and the received sound processing unit 23, respectively.

In Step S42, the received video processing unit 22 decodes the video signal from the receiving unit 21 and outputs the decoded video signal to the display unit 24. Then, the display unit 24 displays the video of the program based on the supplied video signal.

In Step S43, the received sound processing unit 23 decodes and outputs the sound signal supplied from the receiving unit 21. The sound signal output by the received sound processing unit 23 is supplied to the speakers 25-1 and 25-2 and to the adder 33 via the switches 32.

The speakers 25 output the sound of the program based on the sound signal supplied from the received sound processing unit 23. The sound is output by the speakers 25, then reflected by objects and the like around the acoustic echo canceller 11, and reaches the microphones 26. Hereinafter, the path from the speakers 25 to the microphones 26, through which the sound output by the speakers 25 passes, is also referred to as an echo path.

In addition, the adder 33 adds the sound signal supplied from the switches 32-1 and 32-2, and the LPF 34 performs the filtering process on the sound signal added by the adder 33 and supplies the sound signal to the down sampler 35. Then, the down sampler 35 down-samples the sound signal supplied from the LPF 34 and supplies the sound signal to the filtering unit 37, the coefficient updating unit 38, and the update resolution control unit 31 via the switch 36.

In Step S44, the filtering unit 37 generates a pseudo echo signal based on the sound signal supplied from the down sampler 35.

That is, the filtering unit 37 obtains a filter coefficient from the coefficient updating unit 38. This filter coefficient may be an initial value set in advance or may be a value finally updated and held by the coefficient updating unit 38.

The filtering unit 37 performs the filtering process on the sound signal from the down sampler 35 by performing the calculation of the following equation (1) with the use of the filter coefficients obtained from the coefficient updating unit 38 and generates a pseudo echo signal y'(n).

$$y'(n) = \sum_{k=0}^{N-1} h_n(k)x(n-k) \quad (1)$$

In equation (1), x(n) represents a sample value of the sound signal at the time point n (sample value). In addition, $h_n(k)$ represents a filter coefficient multiplied by the sample of the time point (n−k) (0≤k≤N−1) of the sound signal in order to obtain the pseudo echo signal y'(n) at the time point n.

Accordingly, each of the N continuous past sample values of the sound signal including the sample at the time point n is multiplied by the filter coefficient $h_n(k)$ of each sample, and the sum of the sample values obtained by multiplying by the filter coefficients is regarded as a value of the pseudo echo signal at the time point n. In this example, the filter coefficient $h_n(k)$ is for the FIR type adaptive digital filter constituted by N taps.

In Step S45, the microphones 26-1 and 26-2 collect the surrounding sound and supply the echo signal obtained as a result to the adder 27.

The adder 27 adds together the echo signals supplied from the microphones 26, and the LPF 28 performs the filtering process on the echo signals added together by the adder 27 and supplies the echo signal to the down sampler 29. Then, the down sampler 29 down-samples the echo signal supplied from the LPF 28 and supplies the echo signal to the subtractor 30 and the update resolution control unit 31.

The down sampler 29 and the down sampler 35 perform down-sampling on the echo signal of the collected sound and the sound signal of the program in order to match the sampling frequencies of these signals to the sampling frequency of the sound signal of the video telephone.

In Step S46, the subtractor 30 performs the calculation of the following equation (2) based on the echo signal supplied from the down sampler 29 and the pseudo echo signal supplied from the filtering unit 37 and generates a residual signal e(n).

$$e(n)=y(n)-y'(n) \quad (2)$$

In the equation (2), y(n) and y'(n) represent the values (sample values) of the echo signal and the pseudo echo signal at the time point n, respectively. That is, the residual signal e(n) is obtained by subtracting the pseudo echo signal y'(n) from the echo signal y(n). The subtractor 30 supplies the obtained residual signal e(n) to the coefficient updating unit 38 and the update resolution control unit 31. In addition, the residual signal is not supplied to the transmitted sound processing unit 44 for a telephone call during the reproduction of the program since the switch 39 is turned off.

In Step S47, the update resolution control unit 31 performs update resolution control processing. The update resolution information indicating the filter coefficient update resolution is generated and supplied to the coefficient updating unit 38 based on the echo signal from the down sampler 29, the residual signal from the subtractor 30, the sound signal from the switch 36, and the computation resource information from the control unit 40 in the update resolution control processing, which will be described in detail later.

Here, the filter coefficient update resolution represents how many filter coefficients are updated at once among the N filter coefficients constituting the adaptive digital filter when the filter coefficients are updated.

Figure 4:
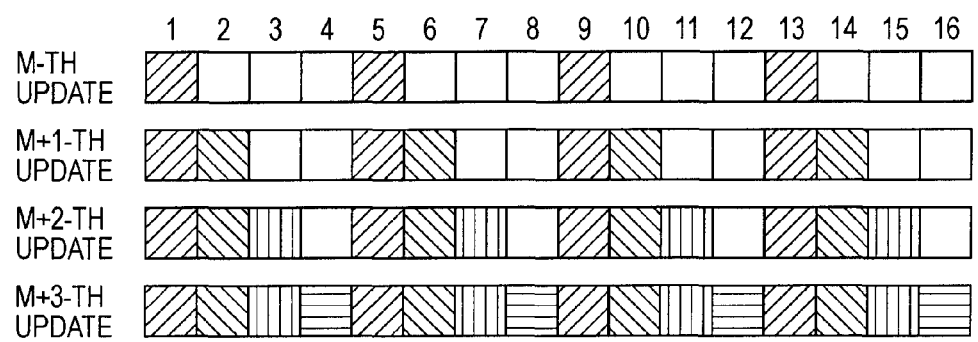
FIG. 4 is a diagram illustrating a filter coefficient update resolution.

When the number of taps N of the adaptive digital filter is sixteen and the update resolution is four as shown in FIG. 4, for example, four filter coefficients are updated among the sixteen filter coefficients at one time of updating the filter coefficients.

In FIG. 4, one square shows one filter coefficient, and the vertical direction in the drawing shows time. In addition, a number of specifying a filter coefficient is added to the upper side of each filter coefficient in the drawing. For example, the filter coefficient at the left end in the drawing is the first filter coefficient and corresponds to the filter coefficient $h_n(0)$ in equation (1).

In the example of FIG. 4, a total of four filter coefficients including the first, fifth, ninth, and thirteenth filter coefficients are updated at the time of M-th updating of the filter coefficients (at the time point M, for example), and the other filter coefficients are not updated. Then, four filter coefficients including the second, sixth, tenth, and fourteenth filter coefficients are updated at the time of (M+1)-th updating of the filter coefficients (at the time point (M+1), for example.

Moreover, four filter coefficients including the third, seventh, eleventh, and fifteenth filter coefficients are updated at the time of (M+2)-th updating of the filter coefficients, and four filter coefficients including the fourth, eighth, twelfth, and sixteenth filter coefficients are updated at the time of (M+3)-th updating of the filter coefficients.

Accordingly, all filter coefficients constituting the adaptive digital filter are updated by the four updatings in this case. The description was given of FIG. 4 as a case in which four filter coefficients arranged at equal intervals are updated at one updating. However, any filter coefficients such as filter coefficients arranged at unequal intervals may be updated as long as the filter coefficient which has not been updated can be updated.

Figure 3:
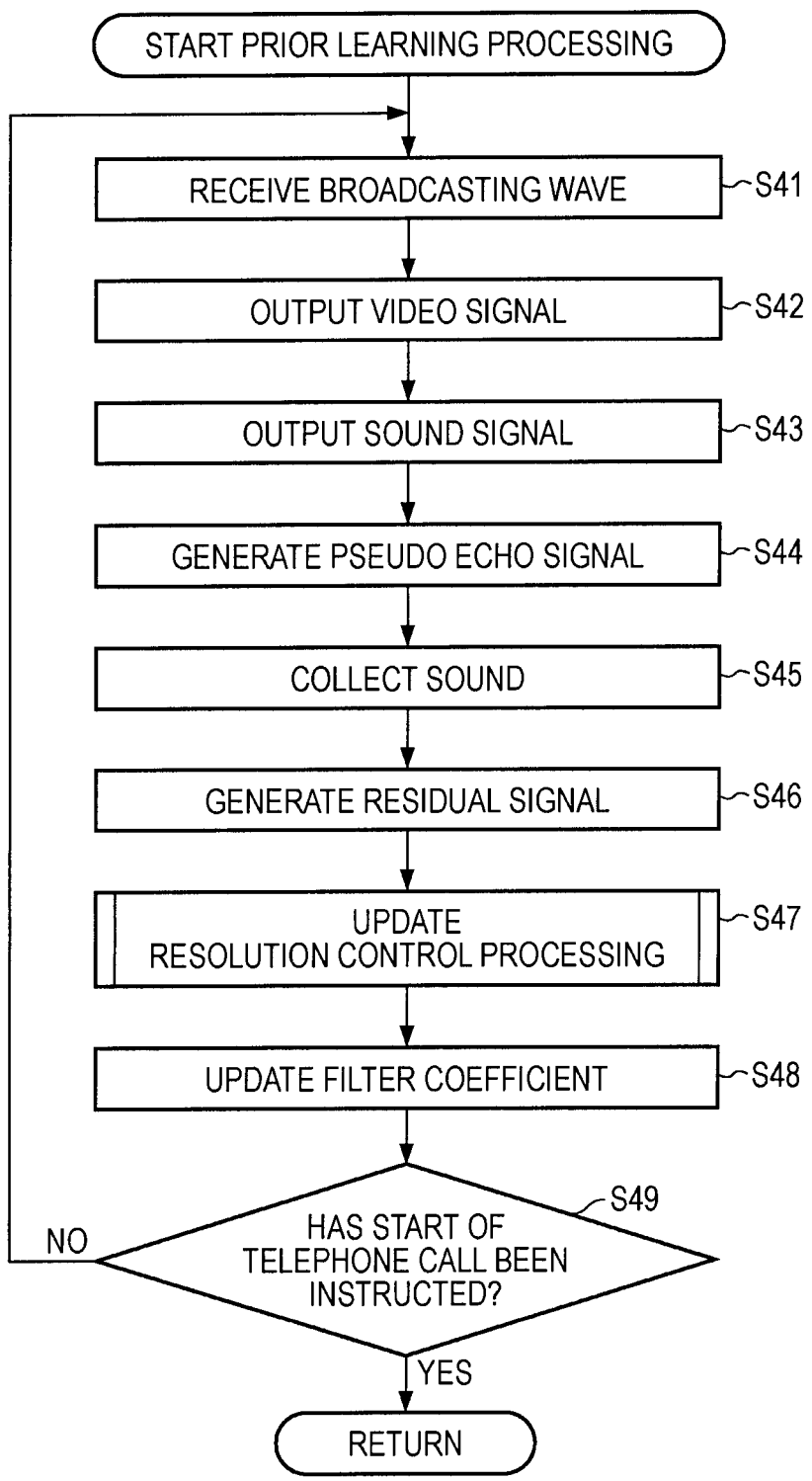
FIG. 3 is a flowchart illustrating prior learning processing.

Returning to the description of the flowchart in FIG. 3, when the update resolution control processing in Step S47 is performed, and the update resolution information is supplied from the update resolution control unit 31 to the coefficient updating unit 38, the processing then proceeds to Step S48.

In Step S48, the coefficient updating unit 38 updates the filter coefficients based on the sound signal from the down sampler 35 and the residual signal from the subtractor 30 at the resolution in accordance with the update resolution information supplied from the update resolution control unit 31.

For example, the coefficient updating unit 38 performs the calculation of the following equation (3) based on the sound signal x(n−j) (0≤j≤N−1) at each time point from the time point n to the time point (n−N+1), the residual signal e(n) at the time point n, and the k-th filter coefficient $h_n(k)$ and updates the filter coefficient. In so doing, the k-th filter coefficient $h_{n+1}(k)$ at the time point (n+1) is obtained.

$$h_{n+1}(k) = h_n(k) + \mu \frac{e(n)x(n-k)}{\sum_{j=0}^{N-1} x(n-j)^2} \quad (3)$$

In equation (3), μ is a convergence coefficient and satisfies 0<μ≤1. In relation to the filter coefficient which is not updated, the filter coefficient $h_n(k)$ at the time point n is used as it is as the filter coefficient $h_{n+1}(k)$ at the time point (n+1). The method of updating the filter coefficient based on equation (3) as described above is called a learning identification algorithm.

The filter coefficient converges so as to simulate the transfer function of the echo path by newly obtaining and updating the filter coefficient by the computation of equation (3), and the pseudo echo signal which is close to the sound from the speakers 25, which is actually collected by the microphones 26, is obtained. That is, it becomes possible to estimate the echo component with higher precision.

When the filter coefficient is updated, the coefficient updating unit 38 supplies the new filter coefficient after the updating to the filtering unit 37, and the processing proceeds to Step S49.

In Step S49, the acoustic echo canceller 11 determines whether or not the user has instructed the start of the telephone call using the video telephone. If it is determined in Step S49 that the start of the telephone call has not been instructed, the processing returns to Step S41, and the aforementioned processing is repeated.

Figure 2:
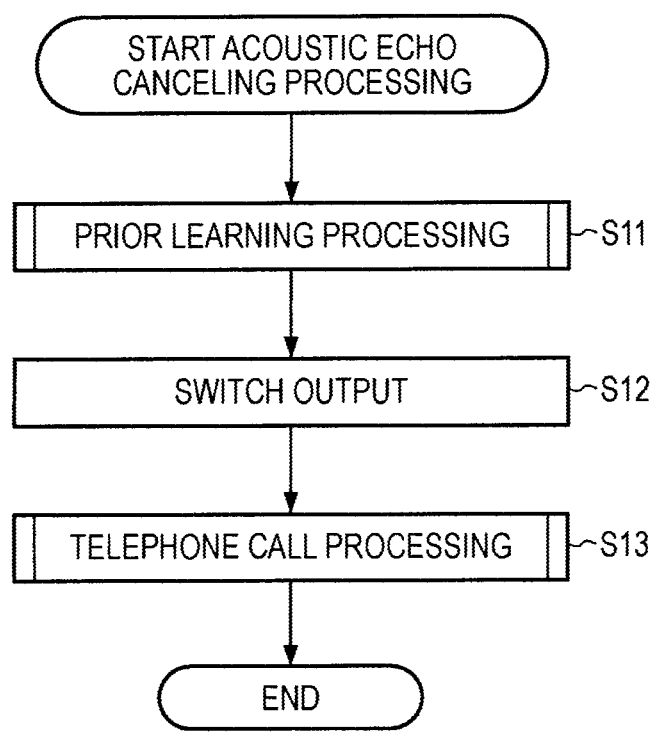
FIG. 2 is a flowchart illustrating acoustic echo canceling processing.

On the other hand, if it is determined in Step S49 that the start of the telephone call has been instructed, the prior learning processing is completed, and the processing then proceeds to Step S12 in FIG. 2. In so doing, each switch of the acoustic echo canceller 11 is shifted, and the telephone call processing by the video telephone is performed.

In the prior learning processing, the filter coefficients are updated in advance during the reproduction of the broadcasted television program immediately before the start of the telephone call using the video telephone as described above. Therefore, it is possible to allot sufficient time and computation capacity to the updating of the filter coefficients. Accordingly, it is possible to obtain the filter coefficients which are appropriate for the environment around the acoustic echo canceller 11 before the actual telephone call processing in which it is necessary to use the filter coefficients.

[Description of Update Resolution Control Processing]

Figure 5:
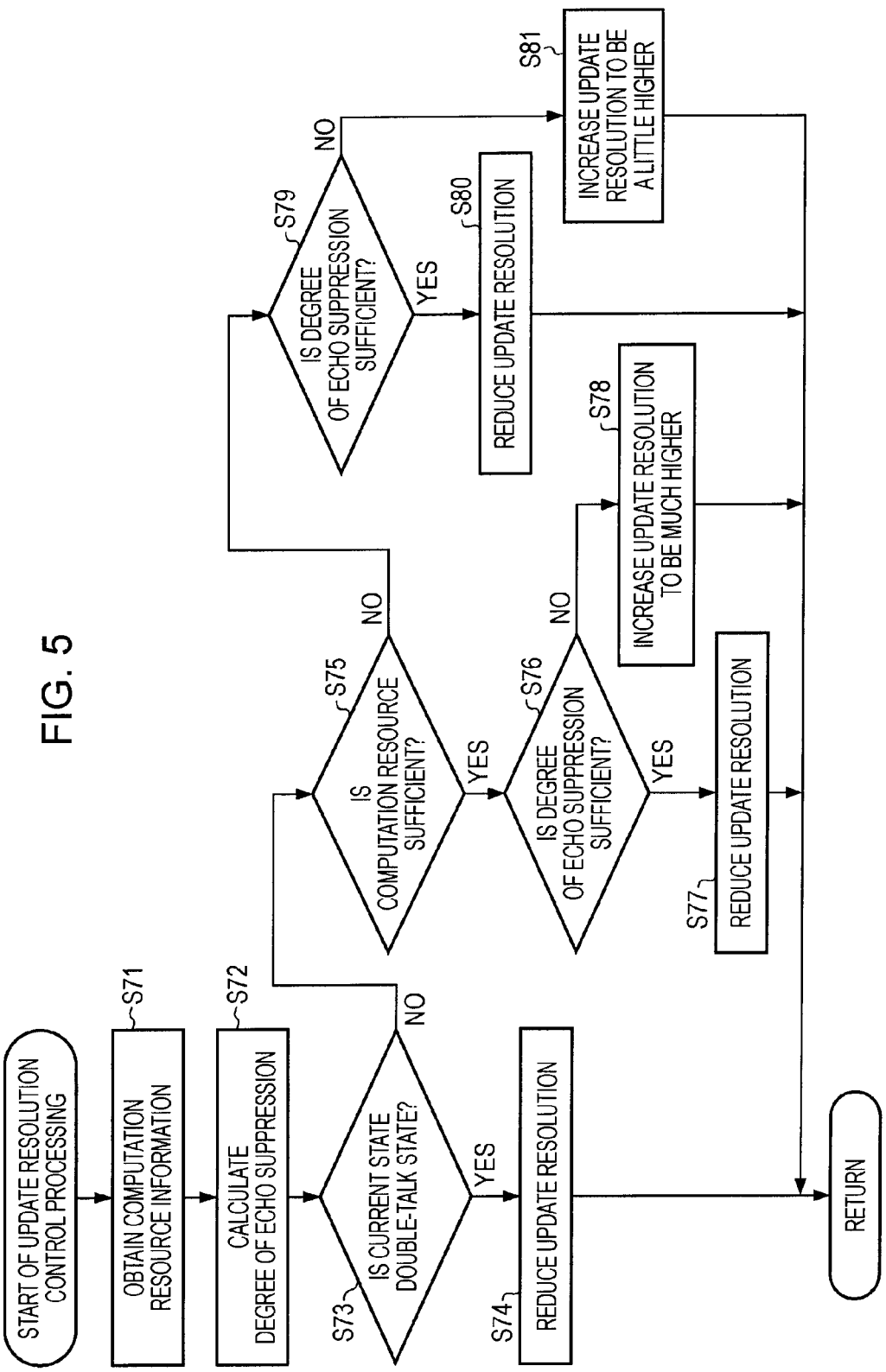
FIG. 5 is a flowchart illustrating update resolution control processing.

Next, description will be given on the update resolution control processing corresponding to the processing in Step S47 in FIG. 3 with reference to the flowchart in FIG. 5.

In Step S71, the update resolution control unit 31 obtains the computation resource information from the control unit 40.

For example, the control unit 40 is a control apparatus such as a CPU (Central Processing Unit), a DSP (Digital Signal Processor), or the like, which is not shown in the drawing, for realizing the coefficient updating unit 38 and the filtering unit 37, and calculates the computation capacity per unit time which can be newly processed at the current time point.

The computation capacity which can be newly processed is obtained by subtracting the computation capacity per unit time of the processing being currently performed by the control apparatus from the maximum value of the computation capacity per unit time which can be processed by the control apparatus. For example, the processing being currently performed is the filter processing by the filtering unit 37 and the filter coefficient updating processing by the coefficient updating unit 38.

The update resolution control unit 31 obtains the computation resource information indicating the thus obtained computation capacity which can be newly processed, from the control unit 40.

In Step S72, the update resolution control unit 31 performs the calculation of the following equation (4) based on the echo signal y(n) from the down sampler 29 and the residual signal e(n) from the subtractor 30 and calculates a degree of echo suppression ERLE (Echo Return Loss Enhancement).

$$ERLE = 10\log_{10}\left(\frac{e(n)^2}{y(n)^2}\right) \quad (4)$$

That is, the degree of echo suppression ERLE is calculated by obtaining a logarithm of the fraction between the square value of the residual signal and the square value of the echo signal. The degree of echo suppression is a power fraction between the echo signal and the residual signal, and the pseudo echo signal indicates how many echo components have been removed from the echo signal. In addition, the unit of the degree of echo suppression is dB, and the value of the degree of echo suppression is increased when more echo components are removed.

In Step S73, the update resolution control unit 31 determines whether or not the current state is a double-talk state. Here, the double-talk state means a state in which sound is output by the speakers 25 and other sound with large volume is generated near the microphones 26 at the near end. For example, the state in which both the counterpart of the telephone call at the far end and the speaker at the near end talk at the same time is a double-talk state.

Accordingly, the update resolution control unit 31 determines whether or not the current state is a double-talk state by comparing the power of the sound signal supplied from the switch 36 with the power of the echo signal supplied from the down sampler 29. Specifically, it is possible to estimate to some extent the power of the sound component output by the speakers 25 included in the echo signal based on the power of the sound signal from the switch 36, and therefore, it is determined that the current state is a double-talk state when the power of the echo signal is significantly larger than the power of the estimated sound component. It is determined that the current state is a double-talk state when the difference between the power of the sound signal from the switch 36 and the power of the echo signal is equal to or greater than a threshold value, for example.

If it is determined that the current state is a double-talk state in Step S73, the update resolution control unit 31 reduces the update resolution in Step S74.

Since a lot of sound at the near end is also included in the echo signal in the double-talk state, for example, learning of the filter coefficient is carried on so as to remove the sound at the near end as well. Thus, in order to prevent such erroneous learning, the update resolution control unit 31 reduces the update resolution and supplies the update resolution information indicating the reduced update resolution to the coefficient updating unit 38 when it is detected that the current state is a double-talk state. Then, when the new update resolution information is supplied to the coefficient updating unit 38, the update resolution control processing is completed, and the processing then proceeds to Step S48 in FIG. 3. In addition, the updating of the filter coefficient may be stopped in Step S74. In such a case, the update resolution is set to 0.

If it is determined that the current state is not the double-talk state in Step S73, the processing proceeds to Step S75.

In Step S75, the update resolution control unit 31 determines whether or not the computation resources of the control apparatus which realizes the coefficient updating unit 38 are sufficient based on the obtained computation resource information. For example, when the computation resource information is equal to or greater than a preset value, it is determined that the computation resources are sufficient.

If it is determined that the computation resources are sufficient in Step S75, the update resolution control unit 31 determines whether or not the degree of echo suppression is sufficient in Step S76. For example, when the calculated degree of echo suppression ERLE is equal to or greater than a predetermined value set in advance, it is determined that the degree of echo suppression is sufficient.

If it is determined that the degree of echo suppression is sufficient in Step S76, the update resolution control unit 31 reduces the update resolution in Step S77.

For example, when the degree of echo suppression is sufficiently large, the filter coefficients sufficiently converge, and filter coefficients which are appropriate for the environment around the acoustic echo canceller 11 have already been obtained at present. That is, it is not necessary to frequently update the filter resolution at present.

Thus, the update resolution control unit 31 reduces the update resolution and supplies the update resolution information indicating the reduced update resolution to the coefficient updating unit 38. For example, when the tap number N of the adaptive digital filter is sixteen, the update resolution is reduced by two from the previous value. In addition, the update resolution may be reduced to a predetermined value set in advance.

As described above, when the filter coefficients sufficiently converge, the control apparatus can reduce the update resolution and reduce the computation capacity of the updating of the filter coefficient, and thereby allot the computation resources to other processing by the reduced amount. In so doing, it is possible to more effectively perform each processing in the acoustic echo canceller 11.

When new update resolution information is supplied to the coefficient updating unit 38, the update resolution control processing is completed, and the processing then proceeds to Step S48 in FIG. 3. In addition, if it is determined that the degree of echo suppression is sufficient in Step S76, the update resolution may not be changed in particular.

If it is determined that the degree of echo suppression is not sufficient in Step S76, the update resolution control unit 31 increases the update resolution to be much higher in Step S78.

If the degree of echo suppression is not sufficient, the filter coefficients have not sufficiently converged, and it is necessary to further update the filter coefficients. Thus, when the degree of echo suppression is not sufficient, and the computation resources are sufficient, the update resolution control unit 31 updates the filter coefficients more frequently by increasing the update resolution to be much higher. For example, when the tap number N of the adaptive digital filter is sixteen, the update resolution is increased by four from the previous value. In so doing, it is possible to allow the filter coefficients to more rapidly converge without imposing an excessive burden on the control apparatus which realizes the coefficient updating unit 38. In addition, the update resolution may be increased up to a predetermined value set in advance.

When the new update resolution information is supplied to the coefficient updating unit 38, the update resolution control processing is completed, and the processing then proceeds to Step S48 in FIG. 3.

If it is determined that the computation resources are not sufficient in Step S75, the update resolution control unit 31 determines whether or not the degree of echo suppression is sufficient in Step S79.

If it is determined that the degree of echo suppression is sufficient in Step S79, the update resolution control unit 31 reduces the update resolution in Step S80. Then, when the update resolution control unit 31 supplies new update resolution information to the coefficient updating unit 38, the update resolution control processing is completed, and the processing then proceeds to Step S48 in FIG. 3.

Since the degree of echo suppression is sufficiently large, and the filter coefficients sufficiently converge in this case as well in the same manner as in Step S77, the filter coefficient update resolution is reduced. In addition, the update resolution may not be changed in particular in Step S80.

On the other hand, if it is determined in Step S79 that the degree of echo suppression is not sufficient, the update resolution control unit 31 increases the update resolution to be a little higher in Step S81.

If the degree of echo suppression is not sufficient, the filter coefficients have not sufficiently converged, and it is necessary to further update the filter coefficients. If the computation resources are not sufficient, and the filter coefficient update resolution is increased to be much higher, nevertheless, the burden on the control apparatus which realizes the coefficient updating unit 38 becomes excessively large.

Thus, when the degree of echo suppression is not sufficient, and the computation resources are not sufficient, the update resolution control unit 31 increases the filter coefficient update resolution to be a little higher. For example, when the tap number N of the adaptive digital filter is sixteen, the update resolution is increased by one. In so doing, it is possible to allow the filter coefficients to more rapidly converge without loading excessive burden on the control apparatus.

In addition, the increased amount of the update resolution in Step S81 is set to be smaller than the increased amount of the update resolution in Step S78.

When the new update resolution information is supplied to the coefficient updating unit 38, the update resolution control processing is completed, and the processing then proceeds to Step S48 in FIG. 3.

As described above, the update resolution control unit 31 appropriately changes the filter coefficient update resolution based on the computation resource information and the degree of echo suppression. In so doing, it is possible to more effectively obtain the filter coefficients which are appropriate for the environment around the acoustic echo canceller 11.

Even when learning of the filter coefficients is not sufficient or when a sudden change occurs in the echo path and sufficient degree of echo suppression is not obtained, it is possible to obtain satisfactory echo canceling performance by appropriately controlling the filter coefficient update resolution in accordance with the computation resources.

When the degree of echo suppression is sufficient, it is possible to reduce the computation capacity which is necessary for updating the filter coefficient by reducing the filter coefficient update resolution. Since the updating is performed on each ¼ number of filter coefficients among all filter coefficients in the example shown in FIG. 4, it is possible to reduce the computation capacity, which is necessary for updating the filter coefficient, to ¼ as compared with an example in the related art.

The filter coefficient update resolution may be increased or reduced by a preset value or may be increased or reduced to a value set in accordance with the degree of echo suppression and the computation resource information.

Although the above description was given of a case in which the update resolution is increased or reduced based on the computation resource information and the degree of echo suppression, the update resolution may be increased or reduced based on the similarity between the pseudo echo signal and the residual signal or the similarity between the echo signal and the residual signal.

When the update resolution is set based on the similarity between the pseudo echo signal and the residual signal, for example, the update resolution control unit 31 obtains the pseudo echo signal from the filtering unit 37 and calculates a cross-correlation coefficient between the pseudo echo signal and the residual signal. In this case, the larger the value of the cross-correlation coefficient becomes, the larger the degree of the similarity between the pseudo echo signal and the residual signal becomes.

Here, when the cross-correlation coefficient is equal to or greater than a predetermined threshold value, the pseudo echo signal and the residual signal are similar to each other. Therefore, the echo component has not been sufficiently removed from the echo signal (residual signal). Thus, when the cross-correlation coefficient is equal to or greater than the threshold value, the update resolution control unit 31 increases the update resolution and generates new update resolution information.

In addition, the update resolution may be increased or decreased based on both the degree of the similarity between the signals such as a pseudo echo signal and the like and the degree of echo suppression. In such a case, it is possible to prevent erroneous learning and the like and thereby realize more appropriate update control. As described above, it is possible to perform more appropriate updating control by increasing or reducing the update resolution based on an appropriate combination of the degree of the similarity between signals, the determination result of whether or not the current state is a double-talk state, the computation resource information, and the degree of echo suppression.

Moreover, the update resolution control unit 31 may specify whether or not the current state is a double-talk state based on the degree of the similarity between signals such as the pseudo echo signal and the like.

[Description of Telephone Call Processing]

When the output of the information by each switch of the acoustic echo canceller 11 is switched after the prior learning processing as described above, the telephone call processing is performed in Step S13 in FIG. 2.

Figure 6:
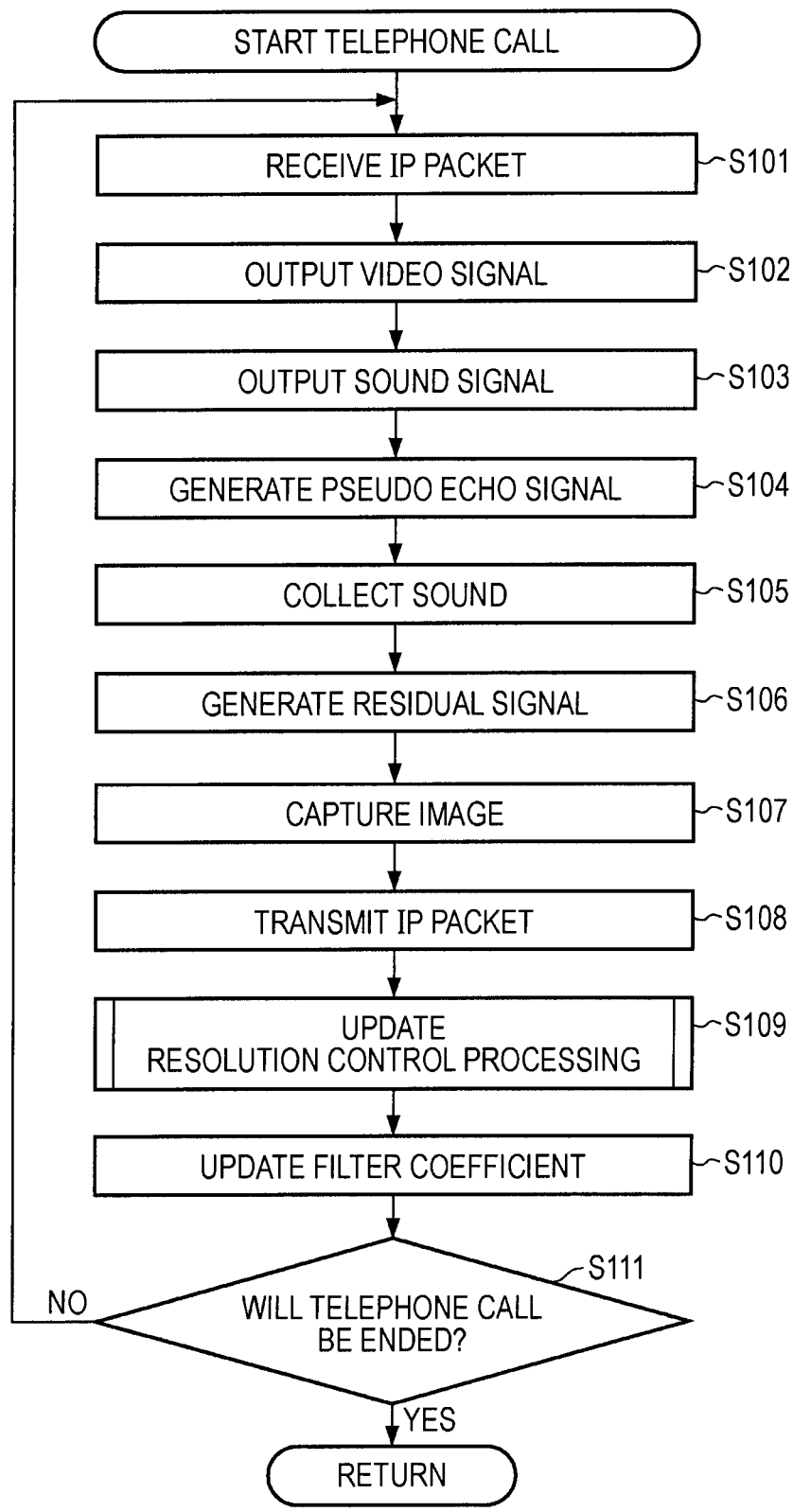
FIG. 6 is a flowchart illustrating telephone call processing.

Hereinafter, description will be given of the telephone call processing corresponding to the processing in Step S13 with reference to the flowchart in FIG. 6. In addition, the switches 32 are turned off, the switch 36 is connected to the received sound processing unit 42 for a telephone call, and the switches 43 and the switch 39 are in the on state at the start of the telephone call processing.

In Step S101, the network control unit 41 receives the IP packets transmitted from the far end via a communication network or the like. The network control unit 41 extracts the video signal and the sound signal from the received IP packets and supplies the video signal and the sound signal to the received video processing unit for a telephone call and the received sound processing unit 42 for a telephone call, which are not shown in the drawing, respectively.

In Step S102, the network control unit 41 causes the received video processing unit for a telephone call to decode the video signal and output the video signal to the display unit 24. The display unit 24 displays the video of the user at the far end based on the video signal supplied from the received video processing unit for a telephone call. That is, the video for the video telephone is displayed.

In Step S103, the received sound processing unit 42 for a telephone call decodes the sound signal from the network control unit 41, outputs the sound signal obtained as a result to the speakers 25 via the switches 43, and outputs the sound signal to the filtering unit 37, the coefficient updating unit 38, and the update resolution control unit 31 via the switch 36. The speakers 25 output the sound of the user at the far end based on the sound signal from the received sound processing unit 42 for a telephone call.

In so doing, the video and the sound for the video telephone from the far end are output by the acoustic echo canceller 11. In response to the video and the sound, the user at the near end talks to the microphones 26 and performs a telephone call with the far end.

In Step S104, the filtering unit 37 obtains a filter coefficient from the coefficient updating unit 38 and generates the pseudo echo signal by performing the filtering process on the sound signal from the received sound processing unit 42 for a telephone call with the use of the filter coefficient.

In Step S104, the same processing as that in Step S44 in the aforementioned learning processing is performed. At this time, the filter coefficient obtained from the coefficient updating unit 38 is a filter coefficient learned in the prior learning processing. That is, this filter coefficient is a filter coefficient with which it is possible to obtain a sufficient degree of echo suppression.

In Step S105, the microphones 26-1 and 26-2 collect the surrounding sound and supplies the echo signal obtained as a result to the adder 27. Here, the sound collected by the microphones 26 includes the sound (echo component) at the far end output by the speakers 25 and the sound generated by the user at the near end.

The echo signals obtained as a result of the sound collection by the microphones 26 are added together by the adder 27, changed to a monaural signal, subjected to the filtering process by the LPF 28, and further down-sampled by the down sampler 29. The down sampler 29 supplies the echo signal obtained by the down-sampling to the subtractor 30 and the update resolution control unit 31.

In Step S106, the subtractor 30 performs the calculation of the aforementioned equation (2) based on the echo signal supplied from the down sampler 29 and the pseudo echo signal supplied from the filtering unit 37 and generates a residual signal.

Since the residual signal is a signal obtained by subtracting the pseudo echo signal which is the estimation result of the echo component from the echo signal which mainly includes the echo component and the sound of the user at the near end, it is possible to regard the residual signal as the sound signal of the sound of the user at the near end.

The subtractor 30 supplies the thus obtained residual signal to the coefficient updating unit 38, the update resolution control unit 31, and the transmitted sound processing unit 44 for a telephone call as the sound at the near end of the video telephone. In addition, the transmitted sound processing unit 44 for a telephone call encodes the residual signal from the subtractor 30 and supplies the residual signal to the network control unit 41 as the sound signal at the near end.

In Step S107, the camera 45 captures an image of the user at the near end and supplies the video signal obtained as a result to the transmitted image processing unit 46 for a telephone call as the video signal for the video at the near end of the video telephone. The transmitted image processing unit 46 for a telephone call encodes the video signal from the camera 45 and supplies the video signal to the network control unit 41.

In Step S108, the network control unit 41 stores the sound signal from the transmitted sound processing unit 44 for a telephone call and the video signal from the transmitted image processing unit 46 for a telephone call in the IP packets and transmits the sound signal and the video signal to the apparatus at the far end via a communication network which is not shown in the drawings. In so doing, the video and the sound at the near end of the video telephone are transmitted to the far end.

In Step S109, the update resolution control unit 31 performs the update resolution control processing to generate the update resolution information and supplies the update resolution information to the coefficient updating unit 38. Since the update resolution control processing in Step S109 is the same as the update resolution control processing described with reference to FIG. 5, the description thereof will be omitted.

In Step S110, the coefficient updating unit 38 performs the calculation of the aforementioned equation (3) based on the sound signal from the received sound processing unit 42 for a telephone call and the residual signal from the subtractor 30 at the resolution in accordance with the update resolution information supplied from the update resolution control unit 31 and updates the filter coefficient. The coefficient updating unit 38 supplies the updated filter coefficient to the filtering unit 37.

In Step S111, the acoustic echo canceller 11 determines whether or not the telephone call using the video telephone will be completed. When the user instructs the completion of the telephone call, for example, it is determined that the telephone call will be completed.

When it is determined that the telephone call will not be completed in Step S111, the processing returns to Step S101, and the aforementioned processing is repeated. That is, the processing of removing (canceling) the echo components is performed on the sound transmitted to the far end during the telephone call using the video telephone.

On the other hand, when it is determined in Step S111 that the telephone call will be completed, the telephone call is completed, and the acoustic echo canceling processing in FIG. 2 is also completed.

Since the processing of canceling the echo component is performed with the use of the filter coefficients which were learned immediately before the start of the telephone call and sufficiently converged as described above for the telephone call using the video telephone, it is possible to obtain a sufficient degree of echo suppression with a small computation capacity immediately after the start of the telephone call. Furthermore, there is no white noise or the like for learning which is disagreeable to the ears before the start of the telephone call.

Second Embodiment

Configuration Example of Acoustic Echo Canceller

Although the above description was given of a case of the television receiver with a video telephone function as an example of the acoustic echo canceller, the acoustic echo canceller is not limited to the example. That is, the acoustic echo canceller may have another configuration as long as the acoustic canceller performs learning of the filter coefficients in advance in the sound processing which differs from the sound processing of canceling the echo component.

Figure 7:
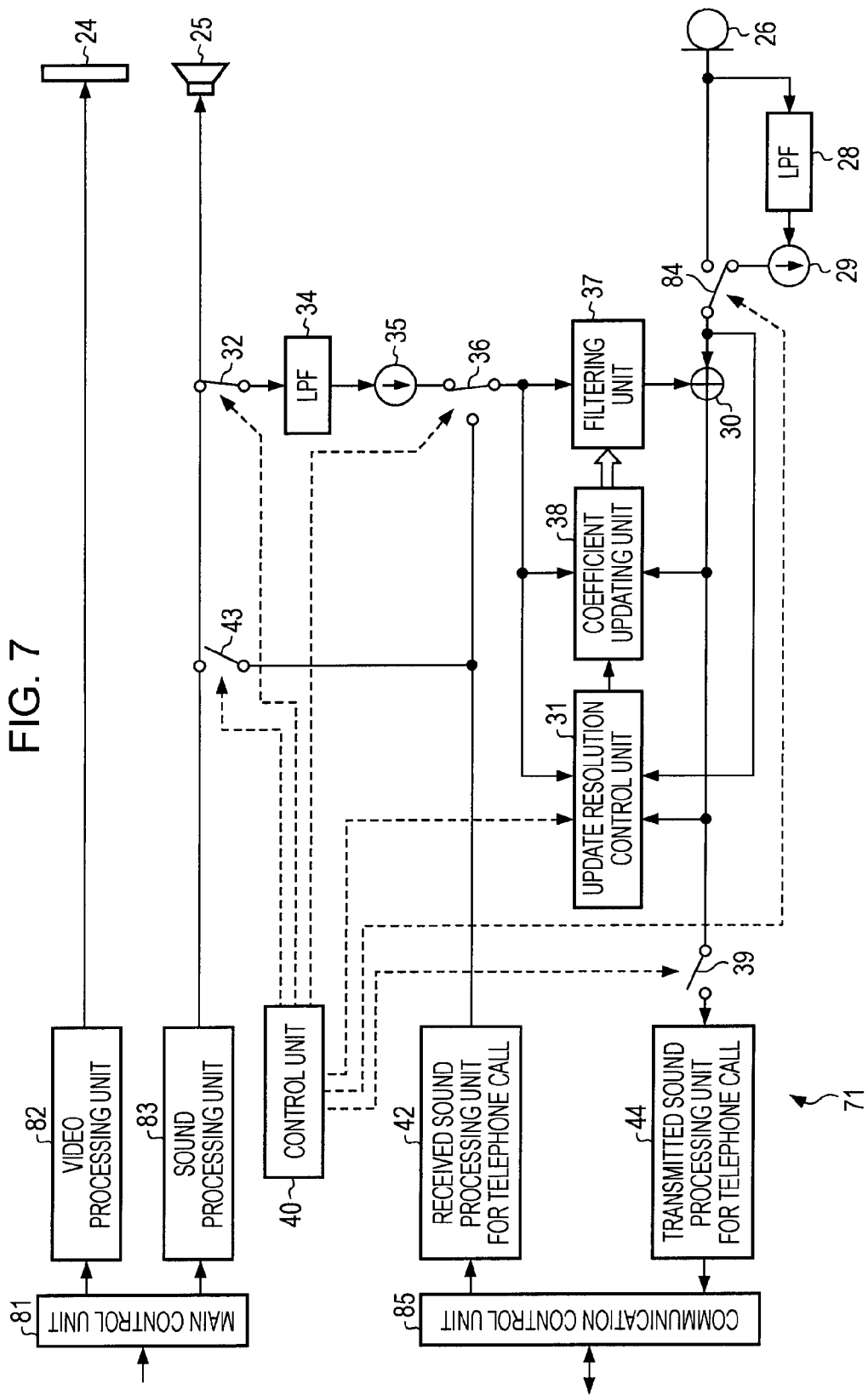
FIG. 7 is a diagram showing another configuration example of an acoustic echo canceller.

Hereinafter, another example of such an acoustic echo canceller will be described. FIG. 7 is a diagram showing another configuration example of an acoustic echo canceller. In FIG. 7, the same reference numerals are used for the parts corresponding to those in the case in FIG. 1, and the description thereof will be appropriately omitted.

An acoustic echo canceller 71 in FIG. 7 is a PND (Portable Navigation Device) or the like with a so-called handsfree telephone call function.

The main control unit 81 analyzes information obtained by an acceleration sensor or a GPS (Global Positioning System), which is not shown in the drawing, and supplies the analysis result to the video processing unit 82 and the sound processing unit 83.

The video processing unit 82 generates map information which displays a current position of a vehicle or the like on which the acoustic echo canceller 71, based on the analysis result from the main control unit 81 and causes the display unit 24 to display the map information. The sound processing unit 83 generates a sound signal of the route guide sound in accordance with the current position based on the analysis result from the main control unit 81 and supplies the sound signal to the speakers 25. In addition, the sound signal output by the sound processing unit 83 is supplied to the filtering unit 37, the coefficient updating unit 38, and the update resolution control unit 31 via the switches 32, the LPF 34, the down sampler 35, and the switch 36.

Moreover, the sound output by the speakers 25 is reflected by the wall or the objects in the vehicle in which the acoustic echo canceller 71 is installed and collected as an echo component by the microphones 26. Then, the echo signal obtained by the sound collection by the microphones 26 is supplied to the subtractor 30 and the update resolution control unit 31 via the switch 84 or to the subtractor 30 and the update resolution control unit 31 via the LPF 28, the down sampler 29, and the switch 84.

The communication control unit 85 communicates with an apparatus at the far end via a communication network which is not shown in the drawing and controls the telephone call. That is, the communication control unit 85 receives the sound signal transmitted from the far end, supplies the sound signal to the received sound processing unit 42 for a telephone call, and transmits the sound signal supplied from the transmitted sound processing unit 44 for a telephone call to the apparatus at the far end.

The control unit 40 turns on the switches 32, connects the switch 36 to the down sampler 35, connects the switch 84 to the down sampler 29, and turns off the switches 43 and the switch 39 during the route guide.

On the other hand, the control unit 40 turns off the switches 32, connects the switch 36 to the received sound processing unit 42 for a telephone call, connects the switch 84 to the microphone 26, and turns on the switches 43 and the switch 39 when a telephone call using the handsfree telephone call function is performed.

[Description of Acoustic Echo Canceling Processing]

Next, description will be made of the operations of the acoustic echo canceller 71. When the user instructs the start of the route guide, for example, the acoustic echo canceller 71 starts the acoustic echo canceling processing to perform the route guide.

In the acoustic echo canceling processing, the sound signal for the route guide is used to perform learning of the filter coefficients of the adaptive digital filter during the route guide. Then, when the user instructs the telephone call using the handsfree telephone call function, the telephone call with the far end is performed, the filter coefficients obtained in learning are used to cancel the acoustic echo, and the sound without the acoustic echo is transmitted to the far end, during the telephone call.

Hereinafter, description will be given of the acoustic echo canceling processing by the acoustic echo canceller 71 with reference to the flowchart in FIG. 8.

In Step S141, the acoustic echo canceller 71 performs the prior learning processing. In the prior learning processing, the map information is displayed, and the sound for the route guide is output. In addition, the sound signal for the route guide is used to perform learning of the filter coefficients. Then, when the user operates the acoustic echo canceller 71 to instruct the start of the telephone call using the handsfree telephone call function during the route guide, the processing proceeds from Step S141 to Step S142. In addition, the detail description will be given of the prior learning processing.

In Step S142, the control unit 40 controls each switch of the acoustic echo canceller 71 to switch the output of the information.

That is, the control unit 40 turns off the switches 32, connects the switch 36 and the switch 84 to the received sound processing unit 42 for a telephone call and the microphones 26, respectively, and turns on the switches 43 and the switch 39. In so doing, the telephone call with the far end becomes possible.

In Step S143, the acoustic echo canceller 71 performs the telephone call processing and completes the acoustic echo canceling processing. In addition, the telephone call using the handsfree telephone function is performed, the filter coefficients obtained in the prior learning processing are used, and the processing of canceling the acoustic echo is performed in the telephone call processing which will be described in detail later.

As described above, the acoustic echo canceller 71 uses the sound signal for the route guide to learn the filter coefficient in advance before the telephone call processing during which the processing of canceling the acoustic echo is performed.

Accordingly, it is possible to start the canceling of the acoustic echo with the use of appropriate filter coefficient without delaying the start of the telephone call processing when the telephone call processing is actually performed. Therefore, it is possible to allow the filter coefficients to more rapidly converge with a low computation capacity after the start of the telephone call processing.

[Description of Prior Learning Processing]

Next, description will be given of the prior learning processing corresponding to the processing in Step S141 in FIG. 8 with reference to the flowchart in FIG. 9. At the start of the prior learning processing, the switches 32 are turned on, the switch 36 is connected to the down sampler 35, the switch 84 is connected to the down sampler 29, and the switches 43 and the switch 39 are in the off state.

In Step S171, the main control unit 81 analyzes the information obtained from various sensors such as an acceleration sensor, GPS, and the like and supplies the analysis result to the video processing unit 82 and the sound processing unit 83.

In Step S172, the video processing unit 82 generates the map information, which displays the current position, based on the analysis result from the main control unit 81 and outputs the map information to the display unit 24. Then, the display unit 24 displays the supplied map information.

In Step S173, the sound processing unit 83 generates and outputs a sound signal for the rouge guide sound in accordance with the current position based on the analysis result from the main control unit 81. The sound signal output by the sound processing unit 83 is supplied to the speakers 25 and to the LPF 34 via the switches 32.

The speakers 25 outputs the sound for the route guide based on the sound signal supplied from the sound processing unit 83. This sound reaches the microphones 26 via the echo path.

In addition, the sound signal supplied from the sound processing unit 83 to the LPF 34 is subjected to the filtering process by the LPF 34, then down-sampled by the down sampler 35, and supplied to the filtering unit 37, the coefficient updating unit 38, and the update resolution control unit 31 via the switch 36.

In Step S174, the filtering unit 37 performs the calculation of the aforementioned equation (1) and generates a pseudo echo signal based on the filter coefficient from the coefficient updating unit 38 and the sound signal from the down sampler 35. The filtering unit 37 supplies the generated pseudo echo signal to the subtractor 30.

In Step S175, the microphones 26 collect the surrounding sound and supply the echo signal obtained as a result to the LPF 28. The echo signal supplied to the LPF 28 is subjected to the filtering process by the LPF 28, then down-sampled by the down sampler 29, and supplied to the subtractor 30 and the update resolution control unit 31 via the switch 84.

In Step S176, the subtractor 30 performs the calculation of the aforementioned equation (2) and generates a residual signal. That is, the subtractor 30 subtracts the pseudo echo signal from the filtering unit 37 from the echo signal from the switch 84 and supplies the residual signal obtained as a result to the coefficient updating unit 38 and the update resolution control unit 31.

When the residual signal is generated, the processing in Steps S177 and S178 is performed to update the filter coefficients. Since this processing is the same as the processing in Steps S47 and S48 in FIG. 3, the description thereof will be omitted.

In Step S179, the acoustic echo canceller 71 determines whether or not the user has instructed the start of the telephone call using the handsfree telephone call function. If it is determined in Step S179 that the start of the telephone call has not been instructed, the processing returns to Step S171, and the aforementioned processing is repeated.

Figure 8:
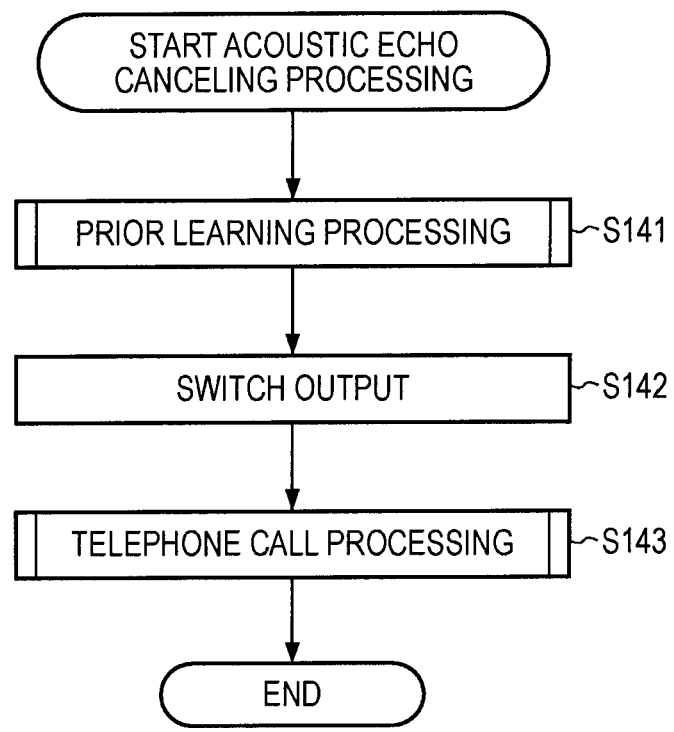
FIG. 8 is a flowchart illustrating acoustic echo canceling processing.
Figure 9:
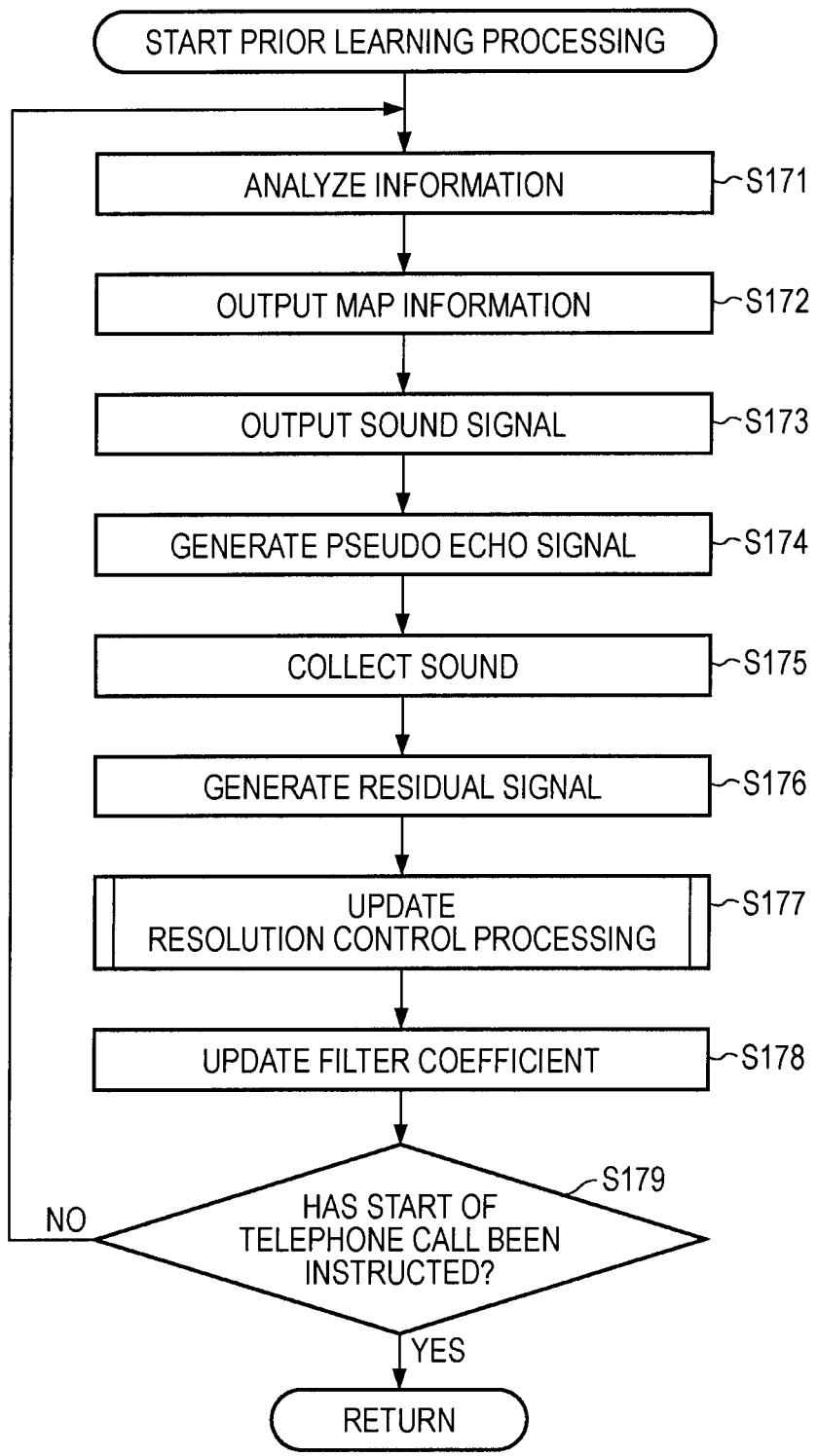
FIG. 9 is a flowchart illustrating prior learning processing.

On the other hand, if it is determined in Step S179 that the start of the telephone call has been instructed, the prior learning processing is completed, and the processing then proceeds to Step S142 in FIG. 8. In so doing, each switch of the acoustic echo canceller 71 is switched, and the telephone call processing by the handsfree telephone call function is performed.

Since the filter coefficients are updated in advance at the time of the rouge guide processing immediately before the start of the telephone call using the handsfree telephone call function according to the prior learning processing as described above, it is possible to allot sufficient time and computation capacity to the updating of the filter coefficients. Accordingly, it is possible to obtain more appropriate filter coefficients before the actual telephone call processing in which it is necessary to use such filter coefficients.

[Description of Telephone Call Processing]

When the output of information by each switch of the acoustic echo canceller 71 is switched after performing the prior learning processing as described above, the telephone call processing is performed in Step S143 in FIG. 8.

Figure 10:
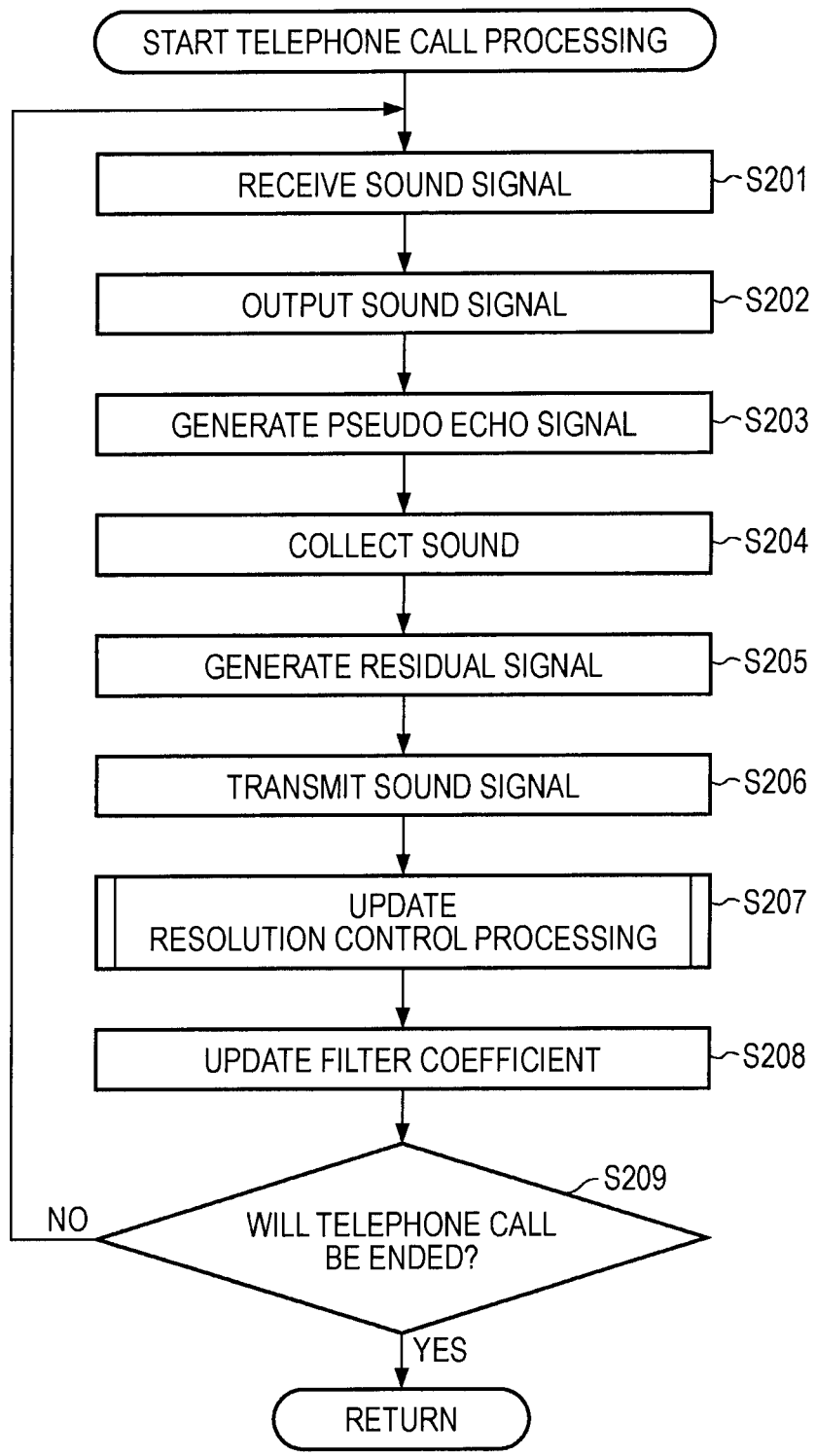
FIG. 10 is a flowchart illustrating telephone call processing.

Hereinafter, description will be given of the telephone call processing corresponding to the processing in Step S143 with reference to the flowchart in FIG. 10. At the start of the telephone call processing, the switches 32 are turned off, the switch 36 and the switch 84 are connected to the received sound processing unit 42 for a telephone call and the microphones 26, respectively, and the switches 43 and the switch 39 are in the on state.

In Step S201, the communication control unit 85 receives the sound signal transmitted from the far end and supplies the sound signal to the received sound processing unit 42 for a telephone call.

In Step S202, the received sound processing unit 42 for a telephone call decodes the sound signal from the communication control unit 85, outputs the sound signal obtained as a result to the speakers 25 via the switches 43, and outputs the sound signal to the filtering unit 37, the coefficient updating unit 38, and the update resolution control unit 31 via the switch 36. The speakers 25 output the sound of the user at the far end based on the sound signal from the received sound processing unit 42 for a telephone call.

In so doing, the acoustic echo canceller 71 outputs the sound from the far end. In response to this, the user at the near end generates sound to the microphones 26 and performs a telephone call with the far end.

In Step S203, the filtering unit 37 obtains the filter coefficients from the coefficient updating unit 38 and performs the filtering process on the sound signal from the received sound processing unit 42 for a telephone call with the use of the filter coefficients to generate a pseudo echo signal. For example, the calculation of the aforementioned equation (1) is performed, and the pseudo echo signal is generated. The pseudo echo signal is supplied to the subtractor 30 from the filtering unit 37.

The filter coefficients used in the processing of Step S203 are the filter coefficients learned in advance in the prior learning processing.

In Step S204, the microphones 26 collect the surrounding sound and supply the echo signal obtained as a result to the subtractor 30 and the update resolution control unit 31 via the switch 84. Here, the sound collected by the microphones 26 includes the sound (echo component) at the far end output by the speakers 25 and the sound generated by the user at the near end.

In Step S205, the subtractor 30 performs the calculation of the aforementioned equation (2) based on the echo signal supplied from the microphones 26 and the pseudo echo signal supplied from the filtering unit 37 and generates a residual signal.

The subtractor 30 supplies the obtained residual signal as sound at the near end to the coefficient updating unit 38, the update resolution control unit 31, and the transmitted sound processing unit 44 for a telephone call. In addition, the transmitted sound processing unit 44 for a telephone call encodes the residual signal from the subtractor 30 and supplies the residual signal as the sound signal at the near end to the communication control unit 85.

In Step S206, the communication control unit 85 transmits the sound signal from the transmitted sound processing unit 44 for a telephone call to the apparatus at the far end via a communication network which is not shown in the drawing.

When the sound signal is transmitted to the far end, the processing in Steps S207 and S208 is then performed, and the filter coefficients are updated. Since the processing is the same in Steps S109 and S110 in FIG. 6, however, the description thereof will be omitted. However, the coefficient updating unit 38 updates the filter coefficients with the use of the sound signal from the received sound processing unit 42 for a telephone call in Step S208.

In Step S209, the acoustic echo canceller 71 determines whether or not the telephone call using the handsfree telephone call function will be completed. When the user instructs the completion of the telephone call, for example, it is determined that the telephone call will be completed.

If it is determined in Step S209 that the telephone call will not be completed, the processing returns to Step S201, and the aforementioned processing is repeated.

On the other hand, if it is determined in Step S209 that the telephone call will be completed, the telephone call processing is completed, and the acoustic echo canceling processing in FIG. 8 is also completed.

Since the filter coefficients which have been learned immediately before the start of the telephone call and sufficiently converged are used to perform the processing of canceling the echo component as described above, it is possible to obtain a sufficient degree of echo suppression using few computations immediately after the start of the telephone call.

Third Embodiment

Configuration Example of Acoustic Echo Canceller

Figure 11:
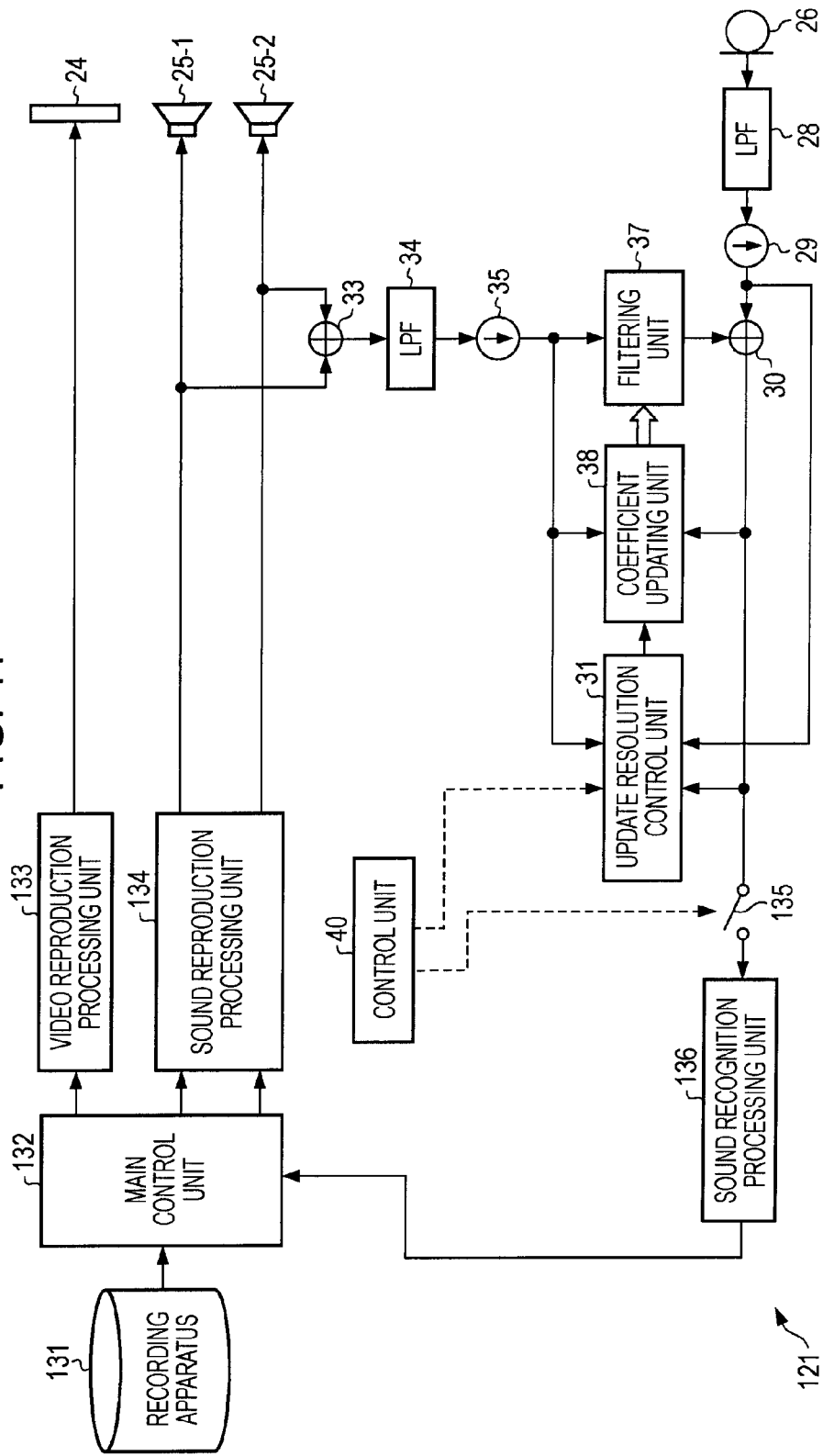
FIG. 11 is a diagram showing another configuration example of an acoustic echo canceller.

FIG. 11 is a diagram showing another configuration example of an acoustic echo canceller. In FIG. 11, the same reference numerals are used for the parts corresponding to the parts in FIG. 1, and the description thereof will appropriately be omitted.

The acoustic echo canceller 121 in FIG. 11 is a reproducing apparatus or the like with a sound remote control function with which the reproduction is controlled by the sound of the user when the content such as a moving image, a music composition, or the like is reproduced.

A recording apparatus 131 records a video signal and a sound signal constituting content, and the main control unit 132 reads the video signal and the sound signal of the designated content from the recording apparatus 131 and supplies the video signal and the sound signal to the video reproduction processing unit 133 and the sound reproduction processing unit 134.

When the content as a target of the reproduction is constituted only by the sound signal, only the sound signal is read and supplied to the sound reproduction processing unit 134. However, the following description will be given of a case in which the content is constituted by the video signal and the sound signal.

The video reproduction processing unit 133 decodes the video signal supplied from the main control unit 132, supplies the video signal to the display unit 24, and causes the display unit 24 to display the video. The sound reproduction processing unit 134 decodes the sound signal supplied from the main control unit 132 and supplies the sound signal to the speakers 25-1 and 25-2 and the adder 33. For example, the sound signal for the right channel is supplied to the speaker 25-1 while the sound signal for the left channel is supplied to the speaker 25-2.

The sound signals supplied from the sound reproduction processing unit 134 to the adder 33 are added together by the adder 33 and supplied to the filtering unit 37, the coefficient updating unit 38, and the update resolution control unit 31 via the LPF 34 and the down sampler 35.

The sound output by the speakers 25 is reflected by the wall and the objects in the room in which the acoustic echo canceller 121 is installed and collected as an echo component by the microphones 26. Then, the echo signal obtained by collecting the sound by the microphones 26 is supplied to the subtractor 30 and the update resolution control unit 31 via the LPF 28 and the down sampler 29.

Moreover, the control unit 40 supplies the computation resource information to the update resolution control unit 31 and controls turning on and off of the switch 135. The switch 135 is for connecting the subtractor 30 which outputs the residual signal and a sound recognition processing unit 136, and the switch 135 is turned on when the reproduction control by the sound remote control function is performed.

The sound recognition processing unit 136 performs sound recognition based on the residual signal supplied from the subtractor 30 and supplies the recognition result to the main control unit 132.

That is, when the reproduction control by the sound remote control function is performed, the user at the near end generates sound corresponding to the command for the reproduction control such as stopping, fast-forwarding, rewinding of the content being reproduced, the selection of the content to be reproduced, or the like toward the microphones 26. Accordingly, the echo signal input to the subtractor 30 includes the sound of the content from the speakers 25 and the sound corresponding to the command for the reproduction control, which is generated by the user. Therefore, the residual signal obtained by subtracting the pseudo echo signal from the echo signal is the signal of the sound corresponding to the command for the reproduction control.

The sound recognition processing unit 136 performs such sound recognition processing on the residual signal to specify the command for the reproduction control indicated by the sound generated by the user, and the main control unit 132 controls the reproduction of the content in accordance with the specification result.

[Description of Acoustic Echo Canceling Processing]

Next, description will be given of the operations of the acoustic echo canceller 121. For example, when the user instructs the start of the reproduction of the content, the acoustic echo canceller 121 starts the acoustic echo canceling processing and reproduces the content.

In the acoustic echo canceling processing, the sound signal of the content is used to learn the filter coefficients of the adaptive digital filter during the reproduction of the content. Then, when the user instructs the start of the reproduction control by the sound remote control function, the reproduction of the content is controlled in accordance with the sound of the user, and the acoustic echo is cancelled with the use of the filter coefficients in order to enhance the precision in recognizing the sound.

Hereinafter, description will be given of an acoustic echo canceling processing by an acoustic echo canceller 121 with reference to the flowchart in FIG. 12.

In Step S231, the acoustic echo canceller 121 performs the prior learning processing. In the prior learning processing, the content is reproduced and the video and the sound are output while the sound signal of the content is used to learn the filter coefficients. When the user operates the acoustic echo canceller 121 and instructs the start of the reproduction control by the sound remote control function during the reproduction of the content, the processing proceeds from Step S231 to Step S232. In addition, the prior learning processing will be described in detail later.

In Step S232, the control unit 40 controls the switch 135 to switch the output of the information. That is, the switch 135 is turned on, and the residual signal output by the subtractor 30 is supplied to the sound recognition processing unit 136. In so doing, it becomes possible to perform the reproduction control by the sound remote control function.

In Step S233, the acoustic echo canceller 121 performs the reproduction control processing and completes the acoustic echo canceling processing. In addition, the content reproduction control by the sound recognition is performed, and the filter coefficients obtained by the prior learning processing are used to perform the processing of canceling the acoustic echo in the reproduction control processing, which will be described in detail later.

As described above, the acoustic echo canceller 121 learns the filter coefficients in advance with the use of the sound signal for the content before the reproduction control processing in which the processing of canceling the acoustic echo is performed.

Accordingly, it is possible to start the canceling of the acoustic echo with the use of appropriate filter coefficients without the delay of the start of the reproduction control processing when the reproduction control processing by the sound recognition is actually performed. Therefore, it is possible to allow the filter coefficients to more rapidly converge with a lower computation capacity after the start of the reproduction control processing.

[Description of Prior Learning Processing]

Next, description will be given of the prior learning processing corresponding to the processing in Step S231 in FIG. 12 with reference to the flowchart in FIG. 13. At the start of the prior learning processing, the switch 135 is in the off state.

In Step S261, the main control unit 132 reproduces the content. That is, the main control unit 132 reads the video signal and the sound signal for the content designated by the user from the recording apparatus 131 and supplies the video signal and the sound signal to the video reproduction processing unit 133 and the sound reproduction processing unit 134.

The video reproduction processing unit 133 decodes the video signal from the main control unit 132, supplies the video signal to the display unit 24, and causes the display unit 24 to display the video. In addition, the sound reproduction processing unit 134 decodes the sound signal from the main control unit 132 and supplies the sound signal to the speakers 25 and the adder 33.

In so doing, the video of the content is displayed on the display unit 24, and the sound of the content is output by the speakers 25. The sound output by the speakers 25 reaches the microphones 26 via the echo path.

In addition, the sound signal supplied to the adder 33 is added by the adder 33, then subjected to the filtering process by the LPF 34, further down-sampled by the down sampler 35, and supplied to the filtering unit 37, the coefficient updating unit 38, and the update resolution control unit 31.

In Step S262, the filtering unit 37 performs the calculation of the aforementioned equation (1) and generates a pseudo echo signal based on the filter coefficients from the coefficient updating unit 38 and the sound signal from the down sampler 35. The filtering unit 37 supplies the generated pseudo echo signal to the subtractor 30.

In Step S263, the microphones 26 collect the surrounding sound and supply the echo signal obtained as a result to the LPF 28. The echo signal supplied to the LPF 28 is subjected to the filtering process by the LPF 28, then down-sampled by the down sampler 29, and supplied to the subtractor 30 and the update resolution control unit 31.

When the sound is collected by the microphones 26, the processing from Step S264 to Step S266 is performed to update the filter coefficients. However, since the processing are the same as the processing from Step S46 to Step S48 in FIG. 3, the description thereof will be omitted.

In Step S267, the acoustic echo canceller 121 determined whether or not the user has instructed the start of the reproduction control by the sound remote control function. If it is determined in Step S267 that the start of the reproduction control has not been instructed, the processing returns to Step S261, and the aforementioned processing is repeated.

Figure 12:
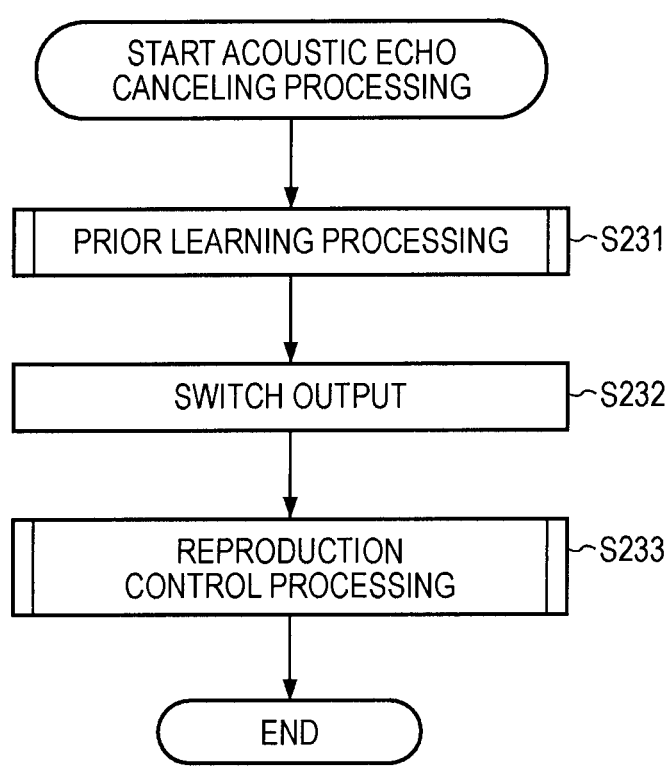
FIG. 12 is a flowchart illustrating acoustic echo canceling processing.
Figure 13:
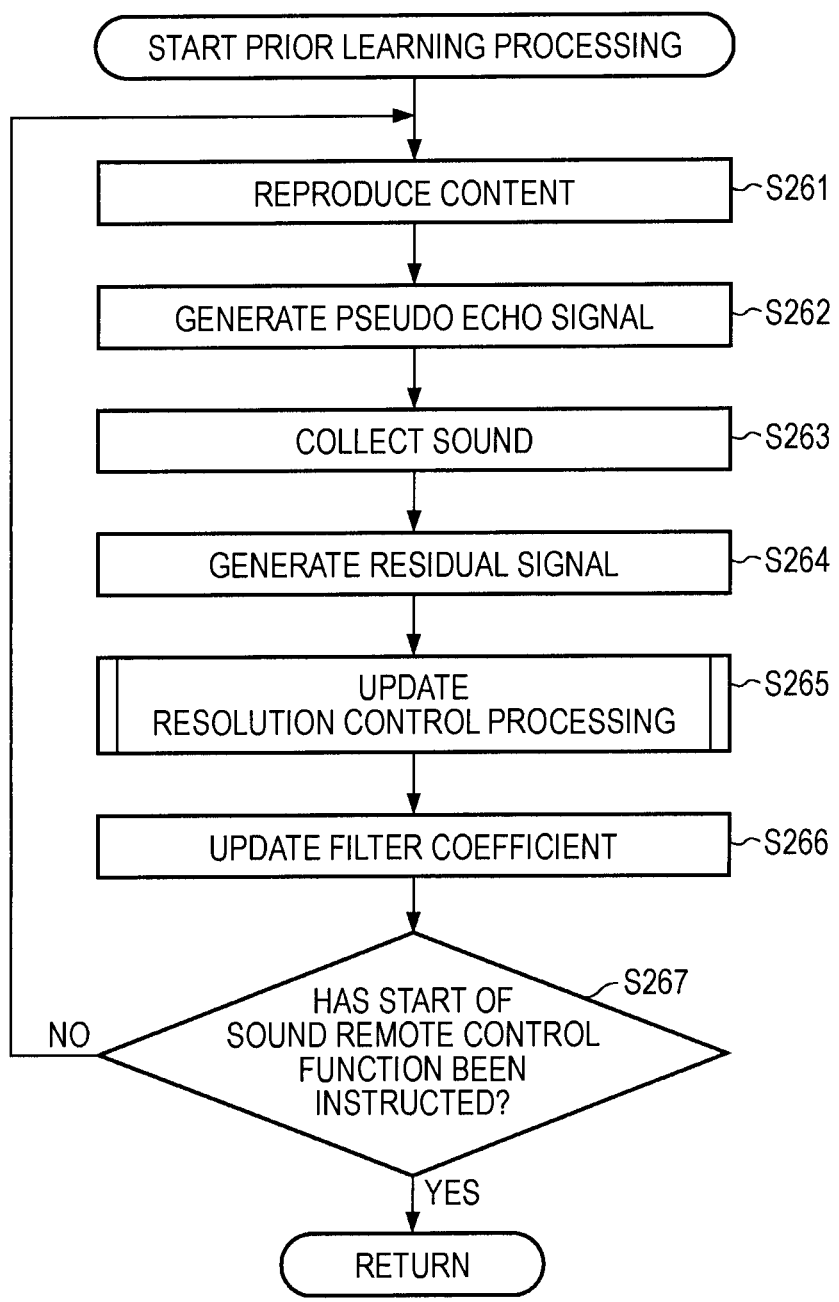
FIG. 13 is a flowchart illustrating prior learning processing.

On the other hand, if it is determined in Step S267 that the start of the reproduction control has been instructed, the prior learning processing is completed, and the processing proceeds to Step S232 in FIG. 12. In so doing, the switch 135 is turned on, and the reproduction control processing by the sound remote control function is performed.

Since the filter coefficients are updated at the time of the reproduction of the content immediately before the start of the reproduction control by the sound remote control function in the prior learning processing as described above, it is possible to allot sufficient time and computation capacity to the updating of the filter coefficients. Accordingly, it is possible to obtain more appropriate filter coefficients before the actual reproduction control processing in which it is necessary to use the filter coefficients.

[Description of Reproduction Control Processing]

When the switch 135 is turned on after the prior learning processing is performed as described above, the reproduction control processing is performed in Step S233 in FIG. 12.

Figure 14:
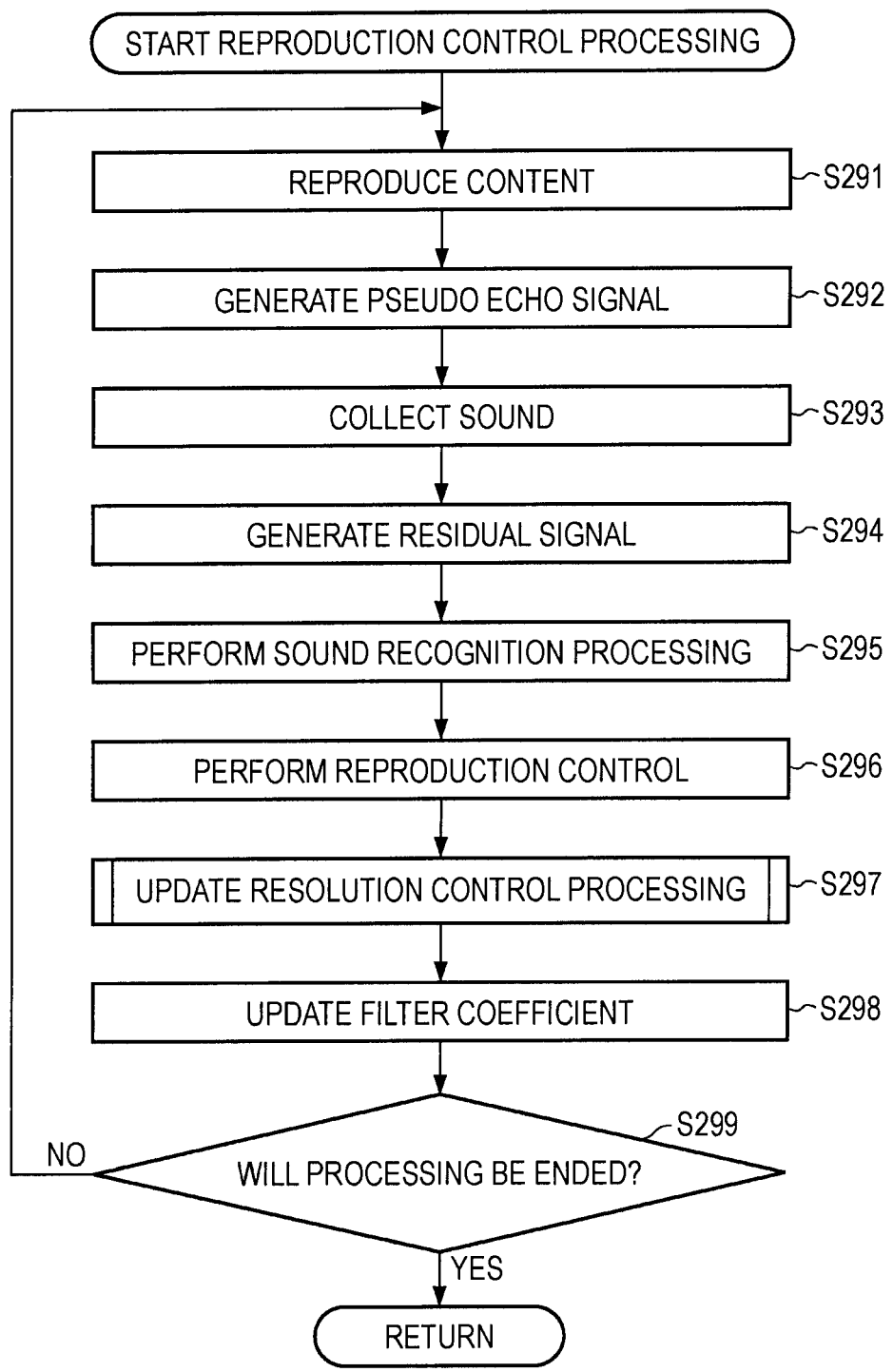
FIG. 14 is a flowchart illustrating reproduction control processing.

Hereinafter, description will be given of the reproduction control processing corresponding to the processing in Step S233 with reference to the flowchart in FIG. 14.

In Step S291, the main control unit 132 reproduces the content. That is, the same processing as that in Step S261 in FIG. 13 is performed, and the content which has been reproduced until then is continuously reproduced. At this time, the sound signal output by the sound reproduction processing unit 134 is supplied to the filtering unit 37, the coefficient updating unit 38, and the update resolution control unit 31 via the adder 33 to the down sampler 35.

In Step S292, the filtering unit 37 obtains the filter coefficients from the coefficient updating unit 38 and generates the pseudo echo signal by performing the filtering process on the sound signal from the down sampler 35 with the use of the filter coefficient. For example, the calculation of the aforementioned equation (1) is performed, and the pseudo echo signal is generated. The pseudo echo signal is supplied from the filtering unit 37 to the subtractor 30. In addition, the filter coefficients used in the processing in Step S292 are filter coefficients obtained in learning by the prior learning processing.

In Step S293, the microphones 26 collect the surrounding sound and supply the echo signal obtained as a result to the subtractor 30 and the update resolution control unit 31 via the LPF 28 and the down sampler 29. The sound collected by the microphones 26 includes the sound (echo component) for the content output by the speakers 25 and the sound generated by the user at the near end.

In Step S294, the subtractor 30 performs the aforementioned equation (2) based on the echo signal supplied from the down sampler 29 and the pseudo echo signal supplied from the filtering unit 37 and generates a residual signal. The residual signal obtained by the subtractor 30 is supplied as the sound corresponding to the command for the reproduction control generated by the user to the coefficient updating unit 38, the update resolution control unit 31, and the sound recognition processing unit 136.

In Step S295, the sound recognition processing unit 136 performs the sound recognition processing on the residual signal supplied from the subtractor 30 and specifies the command for the content reproduction control corresponding to the sound generated by the user. The sound recognition processing unit 136 supplies the specification result of the command for the reproduction control to the main control unit 132.

In Step S296, the main control unit 132 controls the reproduction of the content in response to specification result of the command for the reproduction control supplied from the sound recognition processing unit 136. For example, when a specification result indicating the fast-forward of the content being reproduced is supplied from the sound recognition processing unit 136, the main control unit 132 causes the video reproduction processing unit 133 and the sound reproduction processing unit 134 to reproduce the video and the sound at a predetermined reproduction speed.

When the content reproduction control is performed, the processing in Steps S297 and S298 is then performed to update the filter coefficients. However, since the processing is the same as the processing in Steps S109 and S110 in FIG. 6, the description thereof will be omitted. However, the coefficient updating unit 38 updates the filter coefficients with the use of the sound signal from the down sampler 35 in Step S298.

In Step S299, the acoustic echo canceller 121 determines whether or not the processing will be completed. When the user instructs the completion of the reproduction of the content or the completion of the sound remote control function, for example, it is determined that the processing will be completed.

If it is determined in Step S299 that the processing will not be completed, the processing returns to Step S291, and the aforementioned processing is repeated.

On the other hand, if it is determined in Step S299 that the processing will be completed, the reproduction control processing is completed, and thus the acoustic echo canceling processing in FIG. 12 is also completed.

Since the processing of canceling the echo component is performed with the use of the filter coefficients which have been learned immediately before the start of the sound remote control function and has sufficiently converged at the time of executing the sound remote control function as described above, it is possible to obtain a sufficient degree of echo suppression using few computations immediately after the start of the reproduction control processing.

Fourth Embodiment

Configuration Example of Acoustic Echo Canceller

Figure 15:
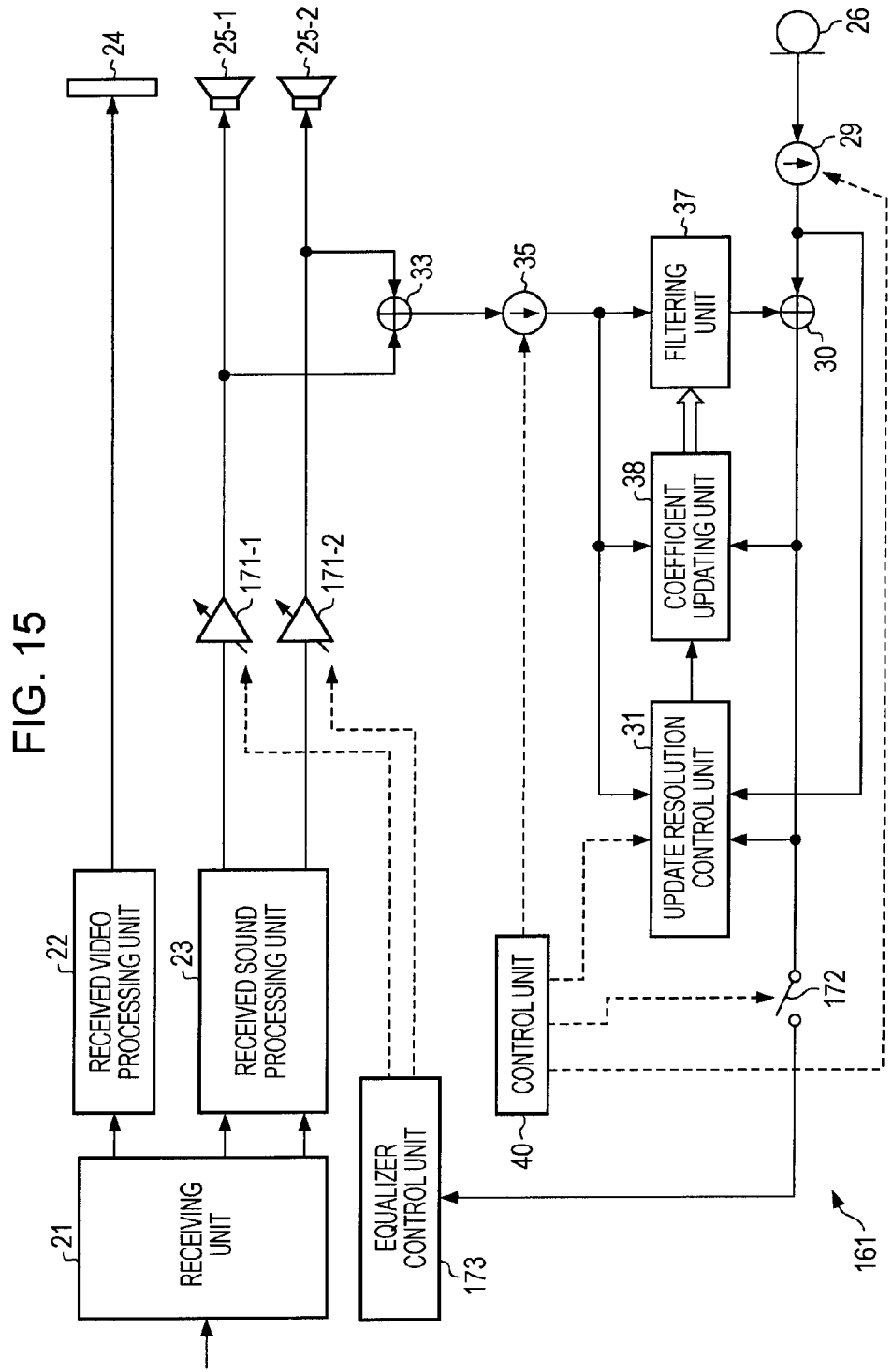
FIG. 15 is a diagram showing another configuration example of an acoustic echo canceller.

FIG. 15 is a diagram showing another configuration example of an acoustic echo canceller. In FIG. 15, the same reference numerals are used for the parts corresponding to those in FIG. 1, and the description thereof will be omitted.

An acoustic echo canceller 161 in FIG. 15 is a television receiver or the like with an equalizer function which is for performing equalizer processing on the sound for a program in accordance with the surrounding environmental sound during the reproduction of the broadcasted television program in order to make it possible to easily listen to the sound, for example.

The sound signal for the program, which has been extracted from the broadcasting wave received by the receiving unit 21 and output by the received sound processing unit 23, is supplied to the adjusters 171-1 and 171-2. The adjusters 171-1 and 171-2 appropriately perform the equalizer processing on the sound signal from the received sound processing unit 23 to adjust the value and the tone color of the sound and supply the sound signal obtained as a result to the speakers 25-1 and 25-2 and to the adder 33. Hereinafter, the adjusters 171-1 and 171-2 are also simply referred to as adjusters 171 when it is not necessary to distinguish the adjusters 171-1 and 171-2.

The sound signals supplied from the adjusters 171 to the adder 33 are added together by the adder 33, changed into a monaural signal, and supplied to the filtering unit 37, the coefficient updating unit 38, and the update resolution control unit 31 via the down sampler 35.

In addition, the sound output by the speakers 25 is reflected by the wall and the objects in a room in which the acoustic echo canceller 161 is installed and collected as an echo component by the microphones 26. Then, the echo signal obtained by the sound collection by the microphones 26 is supplied to the subtractor 30 and the update resolution control unit 31 via the down sampler 29.

The control unit 40 supplies the computation resource information to the update resolution control unit 31 and appropriately changes the thinning values at the down sampler 35 and the down sampler 29, namely the sampling frequencies of the signal after the down-sampling.

In addition, the control unit 40 controls turning on and off of the switch 172. The switch 172 is for connecting the subtractor 30 which outputs the residual signal and the equalizer control unit 173. The switch 172 is turned on when the equalizer processing using the equalizer function is performed. The equalizer control unit 173 controls the equalizer processing by the adjusters 171 based on the residual signal supplied from the subtractor 30.

[Description of Acoustic Echo Canceling Processing]

Next, description will be given of the operations of the acoustic echo canceller 161. When the user instructs the start of the reproduction of a broadcasted television program, for example, the acoustic echo canceller 161 starts the acoustic echo canceling processing and reproduces the program.

In the acoustic echo canceling processing, a sound signal for the program is used to learn filter coefficients of the adaptive digital filter during the reproduction of the program. Then, when the user instructs the equalizer processing using the equalizer function, the equalizer processing is performed on the sound form the program in accordance with the surrounding environmental sound, and the acoustic echo is cancelled with the use of the filter coefficients in order to more appropriately perform the equalizer processing.

Hereinafter, description will be given of the acoustic echo canceling processing by the acoustic echo canceller 161 with reference to the flowchart in FIG. 16.

In Step S321, the acoustic echo canceller 161 performs the prior learning processing. In the prior learning processing, the program is reproduced and the video and the sound are output while learning of the filter coefficients is performed with the use of the sound signal for the program. When the user operates the acoustic echo canceller 161 and instructs the start of the equalizer processing using the equalizer function during the reproduction of the program, the processing proceeds from Step S321 to Step S322. In addition, the prior learning processing will be described in detail later.

In Step S322, the control unit 40 controls the switch 172 to switch the output of the information. That is, the switch 172 is turned on, and the residual signal output from the subtractor 30 is supplied to the equalizer control unit 173. In so doing, it becomes possible to perform the equalizer processing using the equalizer function.

In addition, the control unit 40 controls the down sampler 35 and the down sampler 29 to change the thinning values at the down sampler 35 and the down sampler 29 to predetermined values.

In Step S323, the acoustic echo canceller 161 performs volume control processing, and the acoustic echo canceling processing is completed. The equalizer processing is performed on the sound signal for the program using the equalizer function, and the processing of canceling the acoustic echo is performed with the use of the filter coefficients obtained in the prior learning processing in the volume control processing, which will be described in detail later.

As described above, the acoustic echo canceller 161 learns the filter coefficients in advance with the use of the sound signal for the program before the volume control processing in which the processing of canceling the acoustic echo is performed.

Accordingly, it is possible to start the canceling of the acoustic echo with the use of appropriate filter coefficients without delaying the start of the volume control processing when the volume control processing is actually performed. Therefore, it is possible to allow the filter coefficients to more rapidly converge with a lower computation capacity after the start of the volume control processing.

[Description of Prior Learning Processing]

Next, description will be given of the prior learning processing corresponding to the processing in Step S321 in FIG. 16 with reference to the flowchart in FIG. 17.

At the start of the prior learning processing, the switch 172 is in the off state. Since the processing from Step S351 to Step S353 is the same as the processing from Step S41 to Step S43 in FIG. 3, the description thereof will be omitted.

However, the sound signal for the program output from the received sound processing unit 23 is supplied to the speakers 25 and the adder 33 via the adjusters 171 in Step S353. At this time, the equalizer processing is not particularly performed on the sound signal by the adjusters 171.

When the sound for the program is output by the speakers 25, the sound reaches the microphones 26 via the echo path. In addition, the environmental sound (noise) around the acoustic echo canceller 161 is also input to the microphones 26 as well as the sound for the program.

Moreover, the sound signals supplied from the adjusters 171 to the adder 33 are added together by the adder 33, then down-sampled by the down sampler 35, and supplied to the filtering unit 37, the coefficient updating unit 38, and the update resolution control unit 31.

In Step S354, the filtering unit 37 performs the calculation of the aforementioned equation (1) and generates a pseudo echo signal based on the filter coefficients from the coefficient updating unit 38 and the sound signal from the down sampler 35. The filtering unit 37 supplies the generated pseudo echo signal to the subtractor 30.

In Step S355, the microphones 26 collect the surrounding sound and supply the echo signal obtained as a result to the down sampler 29. The echo signal supplied to the down sampler 29 is down-sampled by the down sampler 29 and supplied to the subtractor 30 and the update resolution control unit 31.

After the processing in Step S355, the processing from Step S356 to Step S358 is performed. Since the processing is the same as the processing from Step S46 to Step S48 in FIG. 3, the description thereof will be omitted.

In Step S359, the acoustic echo canceller 161 determines whether or not the user has instructed the start of the equalizer processing using the equalizer function. If it is determined in Step S359 that the start of the equalizer processing has not been instructed, the processing returns to Step S351, and the aforementioned processing is repeated.

Figure 16:
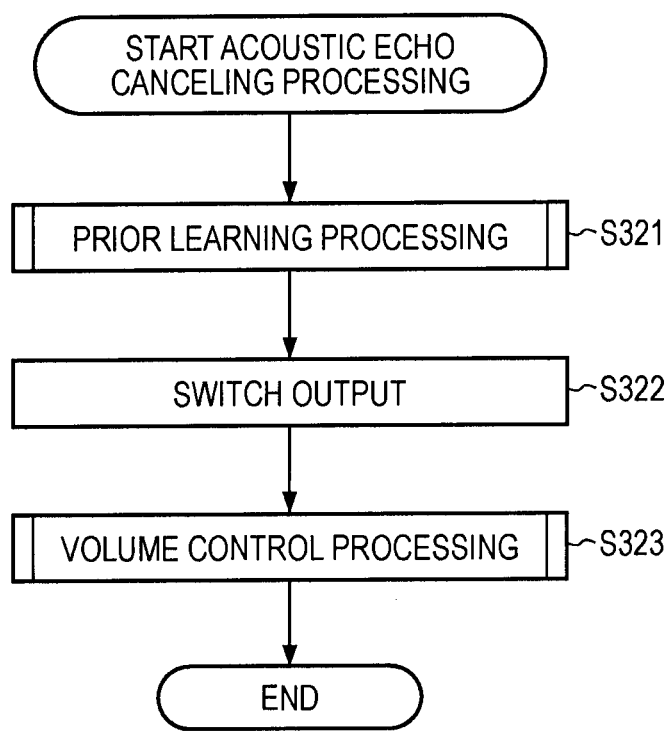
FIG. 16 is a flowchart illustrating acoustic echo canceling processing.
Figure 17:
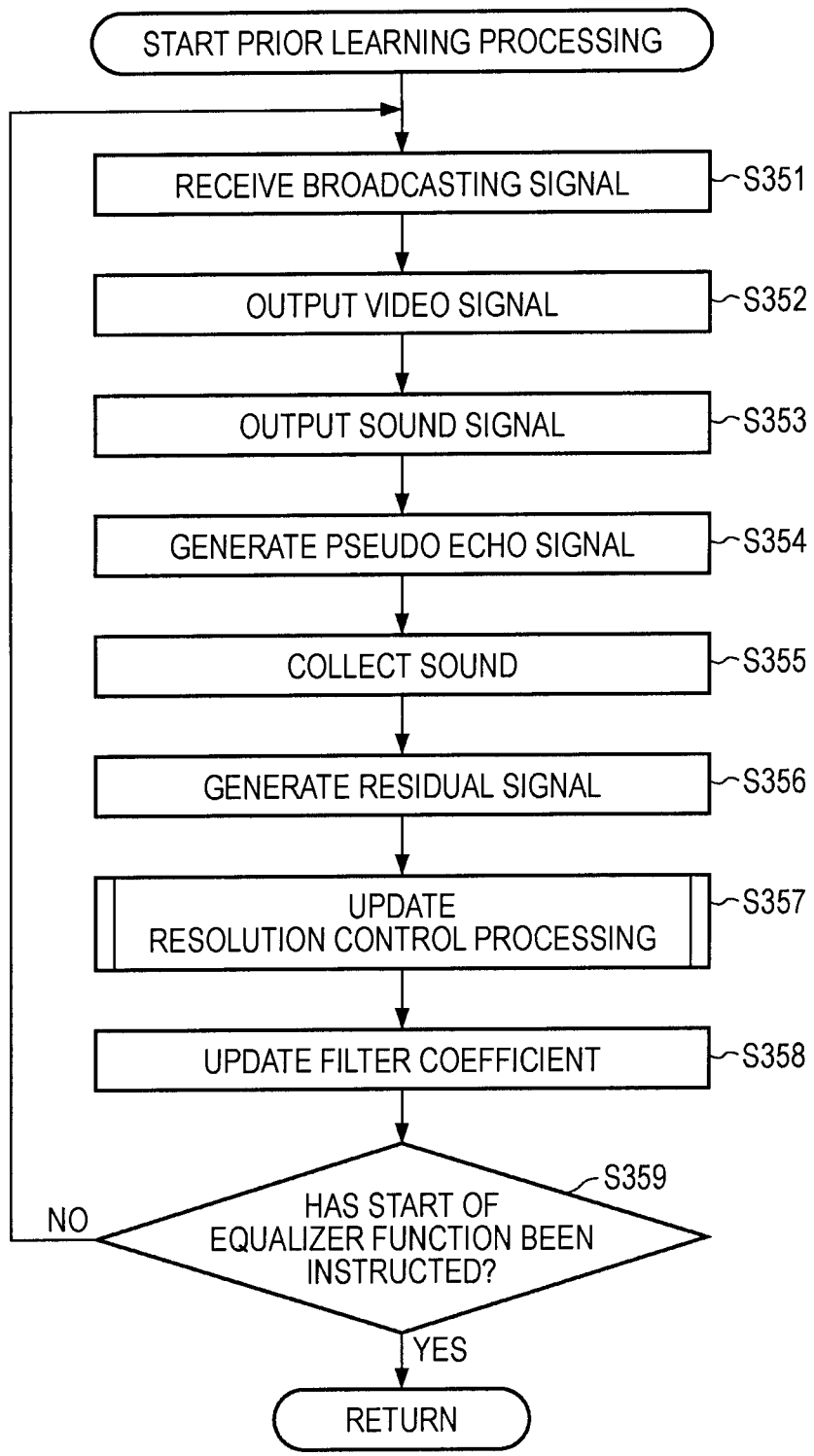
FIG. 17 is a flowchart illustrating prior learning processing.

On the other hand, if it is determined in Step S359 that the start of the equalizer processing has been instructed, the prior learning processing is completed, and the processing then proceeds to Step S322 in FIG. 16. In so doing, the switch 172 is turned on, and the equalizer processing using the equalizer function is performed.

Since the filter coefficients are updated in advance at the time of the reproduction of the program immediately before the start of the execution of the equalizer function in the prior learning processing as described above, it is possible to allot sufficient time and computation capacity to the updating of the filter coefficients. Therefore, it is possible to obtain more appropriate filter coefficients before the actual equalizer processing in which it is necessary to use the filter coefficients.
[Description of Volume Control Processing]

When the switch 172 is turned on after the prior learning processing is performed as described above, the volume control processing is performed in Step S323 in FIG. 16.

Figure 18:
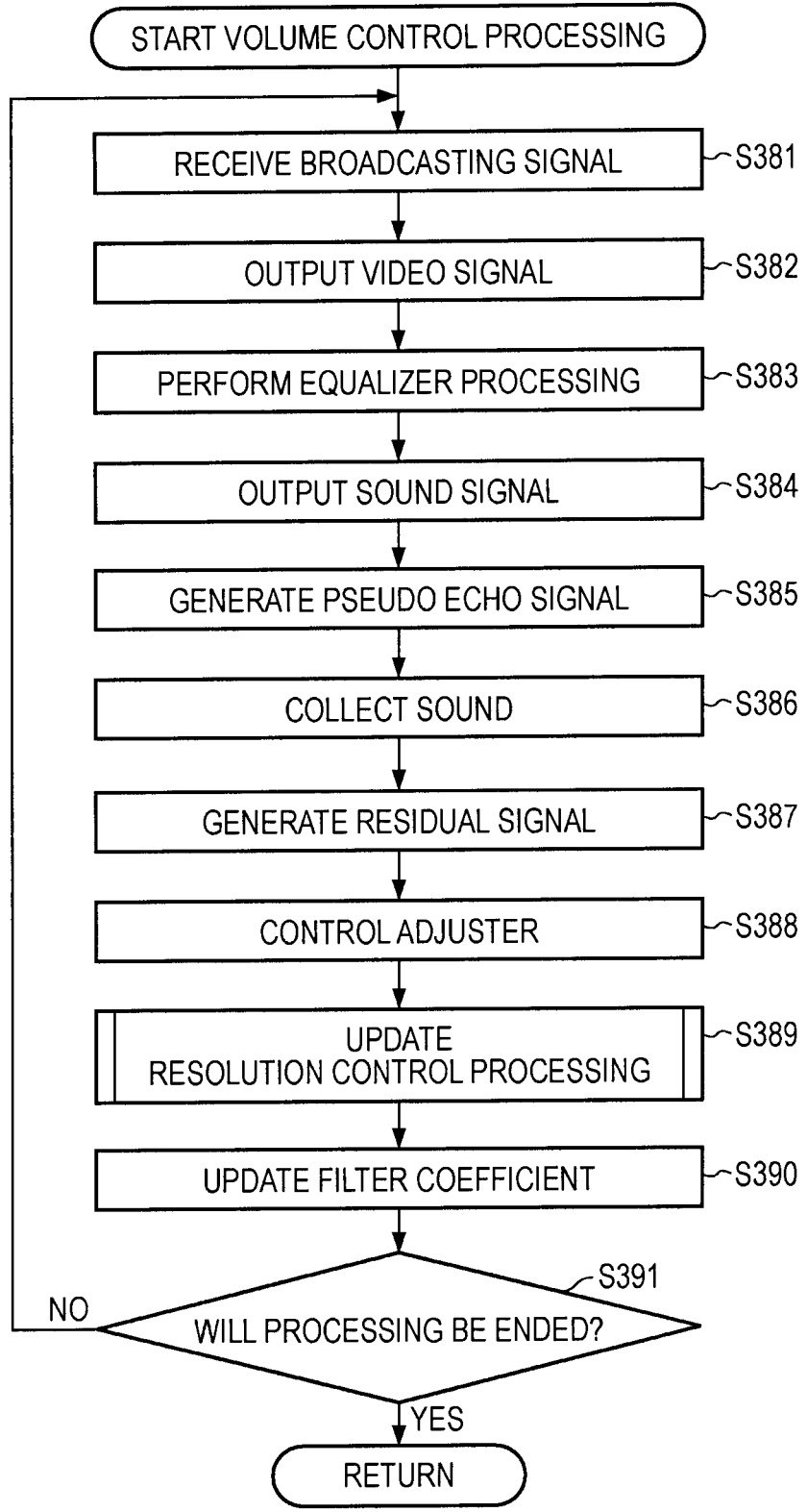
FIG. 18 is a flowchart illustrating volume control processing.

Hereinafter, description will be given of the volume control processing corresponding to the processing in Step S323 with reference to the flowchart in FIG. 18. Since the processing in Step S381 and Step S382 is the same as the processing in Step S351 and Step S352 in FIG. 17, the description thereof will be omitted.

When the processing in Step S381 is performed, the sound signal for the program is supplied from the receiving unit 21 to the received sound processing unit 23. The received sound processing unit 23 decodes the supplied sound signal and supplies the sound signal to the adjusters 171.

In Step S383, adjusters 171 perform the equalizer processing on the sound signal supplied from the received sound processing unit 23 and supply the sound signal to the speakers 25 and the adder 33 based on the control by the equalizer control unit 173. For example, the volume and the tone color of the sound for the program are controlled by the equalizer processing.

In addition, the sound signal supplied to the adder 33 is added by the adder 33, down-sampled by the down sampler 35, and then supplied to the filtering unit 37, the coefficient updating unit 38, and the update resolution control unit 31.

In Step S384, the speakers 25 output the sound for the program based on the sound signal supplied from the adjusters 171. The sound reaches the microphones 26 via the echo path.

In Step S385, the filtering unit 37 obtains the filter coefficients from the coefficient updating unit 38 and generates a pseudo echo signal by performing the filtering process on the sound signal from the down sampler 35 with the use of the filter coefficients. For example, the calculation of the aforementioned equation (1) is performed, and the pseudo echo signal is generated. The pseudo echo signal is supplied from the filtering unit 37 to the subtractor 30. In addition, the filter coefficients used in the processing in Step S385 are filter coefficients learned in advance in the prior learning processing.

In Step S386, the microphones 26 collect the surrounding sound and supply the echo signal obtained as a result to the subtractor 30 and the update resolution control unit 31 via the down sampler 29. Here, the sound collected by the microphones 26 includes the sound (echo component) output by the speakers 25 and the surrounding environmental sound.

In Step S387, the subtractor 30 performs the calculation of the aforementioned equation (2) based on the echo signal supplied from the down sampler 29 and the pseudo echo signal supplied from the filtering unit 37 and generates a residual signal. The subtractor 30 supplies the obtained residual signal as a signal for the environmental sound to the coefficient updating unit 38, the update resolution control unit 31, and the equalizer control unit 173.

In Step S388, the equalizer control unit 173 controls the equalizer processing by the adjusters 171 based on the residual signal supplied from the subtractor 30.

For example, the equalizer control unit 173 analyzes the residual signal and determines an optimal value and a tone color of the sound for the program based on the volume or the resolution property of the surrounding environmental sound obtained as a result. Then, the equalizer control unit 173 controls the operations of the adder 171 in Step S383 such that the sound with the determined volume and tone color is output from the speakers 25. In so doing, the user can easily listen to the sound for the program even when the noise around the acoustic echo canceller 161 is large.

When the equalizer processing is controlled, the processing in Step S389 and Step S390 is then updated. However, since the processing is the same as the processing in Step S109 and Step S110 in FIG. 6, the description thereof will be omitted. However, the coefficient updating unit 38 updates the filter coefficients with the use of the sound signal from the down sampler 35 in Step S390.

In Step S391, the acoustic echo canceller 161 determines whether or not the processing will be completed. When the user instructs the completion of the reproduction of the program or the completion of the equalizer function, for example, it is determined that the processing will be completed.

If it is determined in Step S391 that the processing will not be completed, the processing returns to Step S381, and the aforementioned processing is repeated.

On the other hand, if it is determined in Step S391 that the processing will be completed, the volume control processing is completed, and thus the acoustic echo canceling processing in FIG. 16 is also completed.

Since the processing of canceling the echo component is performed with the use of the filter coefficients which have been learned immediately before the start of the equalizer function and have sufficiently converged when the equalizer function is executed as described above, it is possible to obtain a sufficient degree of echo suppression using few computations immediately after the start of the volume control processing.

The aforementioned series of processing can be executed by hardware or software. When the series of processing is executed by the software, a program constituting the software is installed from a program recording medium on a computer mounted on dedicated hardware or a general personal computer capable of executing various functions by installing various programs.

Figure 19:
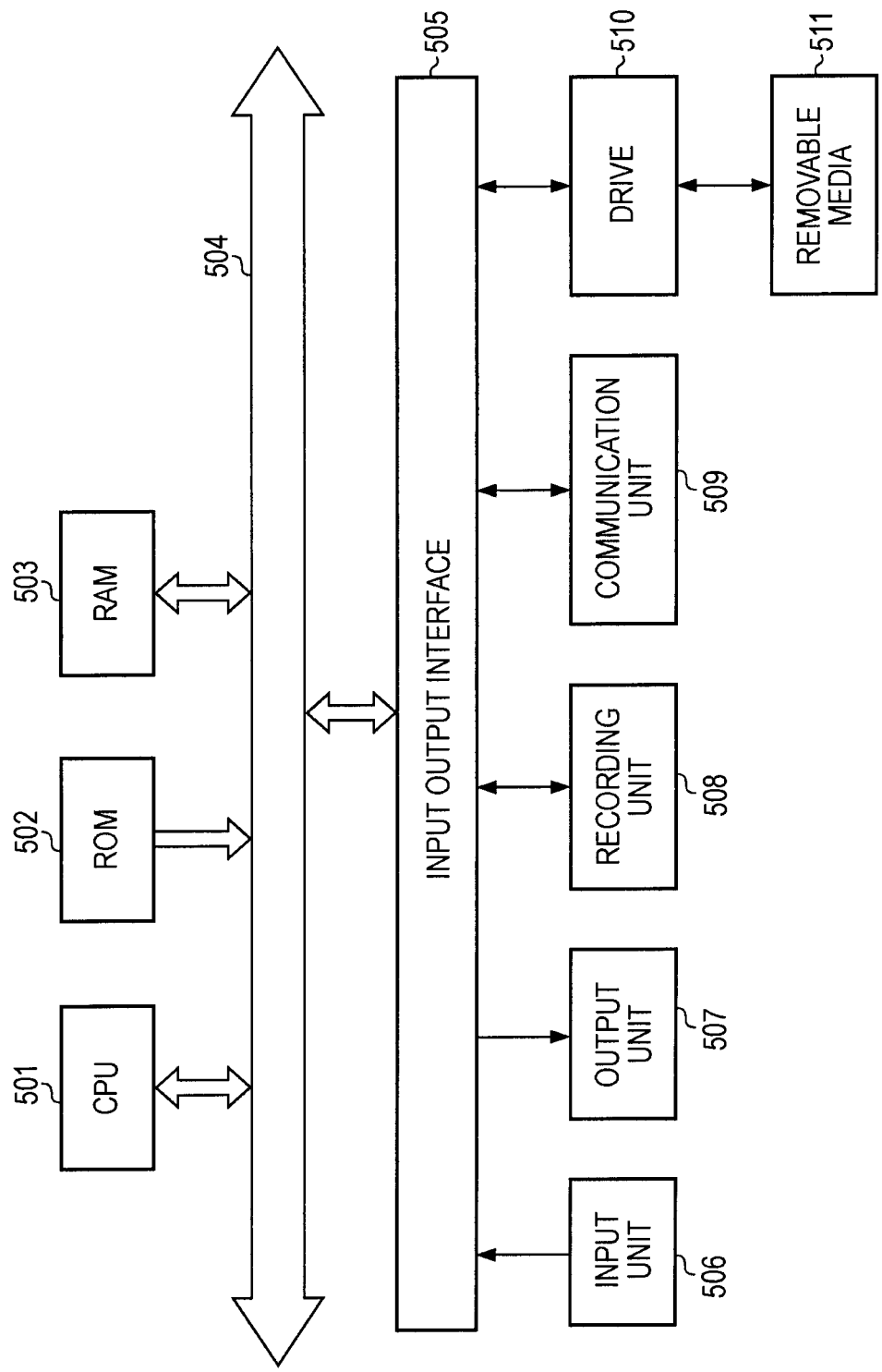
FIG. 19 is a diagram showing a configuration example of a computer.

FIG. 19 is a block diagram showing a configuration example of hardware of a computer which executes the aforementioned series of processing by a program.

In the computer, the CPU 501, the ROM (Read Only Memory) 502, and the RAM (Random Access Memory) 503 are connected to each other by a bus 504.

An input and output interface 505 is further connected to the bus 504. An input unit 506 such as a keyboard, a mouse, a microphone, and the like, an output unit 507 such as a display, a speaker, and the like, a recording unit 508 such as a hard disk, a nonvolatile memory, and the like, a communication unit 509 such as a network interface and the like, and a drive 510 which drives a removable medium 511 such as a magnetic disk, an optical disc, a magneto-optical disc, a semiconductor memory, or the like are connected to the input and output interface 505.

In the computer with the above configuration, the aforementioned series of processing is performed by loading the program recorded on the recording unit 508 into the RAM 503 via the input and output interface 505 and the bus 504 and executing the program by the CPU 501, for example.

The program executed by the computer (CPU 501) is provided by being recorded on a removable medium 511 as a package medium such as a magnetic disk (including a flexible disk), an optical disc (CD-ROM (Compact Disc-Read Only Memory), a DVD (Digital Versatile Disc), or the like), a magneto-optical disc, a semiconductor memory, or the like or through a wired or wireless transmission medium such as a Local Area Network, the Internet, a digital satellite broadcasting, or the like.

In addition, the program can be installed on the recording unit 508 via the input and output interface 505 by mounting the removable media 511 on the drive 510. In addition, the program can be received by the communication unit 509 via the wired or wireless transmission medium and installed on the recording unit 508. Otherwise, it is also possible to install the program in advance on the ROM 502 or the recording unit 508.

The program executed by the computer may be a program by which the processing is performed in a time series manner in the order described in this specification or may be a program by which the processing is performed in parallel or at necessary timing such as timing of calling or the like.

The embodiments of the present disclosure are not limited to the aforementioned embodiments, and various modifications can be made within the scope of the present disclosure.

The present disclosure contains subject matter related to that disclosed in Japanese Priority Patent Application JP 2010-287450 filed in the Japan Patent Office on Dec. 24, 2010, the entire contents of which are hereby incorporated by reference.

What is claimed is:

1. A sound processing apparatus comprising:
one or more processors operable to:
output sound based on a first sound signal as first sound processing when execution of the first sound processing is instructed;
generate an echo signal by collecting surrounding sound;
perform filtering process on the first sound signal based on one or more filter coefficients and generate a pseudo echo signal;
remove a sound component from the echo signal by subtracting the pseudo echo signal from the echo signal to generate a residual signal;
update the one or more filter coefficients based on the residual signal and the first sound signal; and
control resolution at which the one or more filter coefficients are updated,
wherein the one or more processors are operable to output sound based on a second sound signal as second sound processing when execution of the second sound processing is instructed after the first sound processing,
wherein the one or more processors are operable to generate the pseudo echo signal by performing the filtering process on the second sound signal based on the updated one or more filter coefficients in the second sound processing, and
wherein the one or more processors are operable to generate the residual signal used in the second sound processing by subtracting the pseudo echo signal from the echo signal in the second sound processing.

2. The sound processing apparatus according to claim 1, wherein the one or more processors are operable to calculate a degree of echo suppression based on the echo signal and the residual signal, and increase or reduce the resolution based on the degree of echo suppression.

3. The sound processing apparatus according to claim 2, wherein the one or more processors are operable to increase the resolution when the degree of echo suppression is less than a predetermined threshold value.

4. The sound processing apparatus according to claim 3, wherein the one or more processors are operable to:
increase the resolution by a predetermined value when a computation capacity is equal to or greater than a preset value, and
increase the resolution by a value which is less than the predetermined value when the computation capacity is less than the preset value and if the degree of echo suppression is less than the threshold value.

5. The sound processing apparatus according to claim 2, wherein the one or more processors are operable to reduce the resolution when the degree of echo suppression is equal to or greater than a predetermined threshold value.

6. The sound processing apparatus according to claim 2, wherein the first sound processing is processing of reproduction of content, and the second sound processing is processing of communication with a counterpart.

7. The sound processing apparatus according to claim 2, wherein the first sound processing is route guide processing by sound, and the second sound processing is processing of communication with a counterpart.

8. The sound processing apparatus according to claim 1, wherein the one or more processors are operable to increase or reduce the resolution in accordance with a degree of similarity between the pseudo echo signal and the residual signal or a degree of similarity between the echo signal and the residual signal.

9. The sound processing apparatus according to claim 1, wherein the one or more processors are operable to reduce the resolution or stop the updating of the one or more filter coefficients when a current state is detected to be in a double-talk state.

10. The sound processing apparatus according to claim 1, wherein the one or more processors are operable to calculate a cross-correlation coefficient between the pseudo echo signal and the residual signal.

11. The sound processing apparatus according to claim 10, wherein a degree of the similarity between the pseudo echo signal and the residual signal is based on the cross-correlation coefficient between the pseudo echo signal and the residual signal.

12. A sound processing method comprising:
in a sound processing apparatus:
outputting sound based on a first sound signal as a first sound processing;
generating an echo signal by collecting surrounding sound;
performing filtering process on the first sound signal based on one or more filter coefficients to generate a pseudo echo signal;
generating a residual signal from the echo signal and the pseudo echo signal;
updating one or more filter coefficients based on the residual signal and the first sound signal;
controlling a resolution at which the one or more filter coefficients are updated; and
outputting sound based on a second sound signal as second sound processing when execution of the second sound processing which is different from the first sound processing is instructed after the first sound processing.

13. The sound processing method according to claim 12, wherein a degree of the similarity between the pseudo echo signal and the residual signal is based on a cross-correlation coefficient between the pseudo echo signal and the residual signal.

14. The sound processing method according to claim 12, further comprising specifying a double-talk state based on a degree of similarity between the pseudo echo signal and the residual signal.

15. The sound processing method according to claim 14, further comprising reducing the resolution when a current state is in the double-talk state.

16. The sound processing method according to claim 12, further comprising generating the pseudo echo signal by performing a filtering process on the second sound signal with the use of the updated one or more filter coefficients in the second sound processing.

17. The sound processing method according to claim 12, further comprising generating the residual signal used in the second sound processing by subtracting the pseudo echo signal from the echo signal in the second sound processing.

18. A non-transitory computer-readable storage medium having stored thereon, a computer program having at least one code section for processing, the at least one code section being executable by a computer for causing the computer to perform steps comprising:
  outputting sound based on a first sound signal as first sound processing when execution of the first sound processing is instructed;
  generating an echo signal by collecting surrounding sound;
  performing filtering process on the first sound signal based on one or more filter coefficients to generate a pseudo echo signal;
  removing a sound component from the echo signal by subtracting the pseudo echo signal from the echo signal to generate a residual signal;
  updating the one or more filter coefficients based on the residual signal and the first sound signal;
  controlling a resolution at which the one or more filter coefficients are updated;
  outputting sound based on a second sound signal as second sound processing when execution of the second sound processing which is different from the first sound processing is instructed after the first sound processing;
  generating the pseudo echo signal by performing the filtering process on the second sound signal with the use of the updated one or more filter coefficients in the second sound processing; and
  generating the residual signal used in the second sound processing by subtracting the pseudo echo signal from the echo signal in the second sound processing.

19. A sound processing apparatus comprising:
one or more processors operable to:
output sound based on a sound signal as first sound processing when execution of the first sound processing is instructed;
generate an echo signal by collecting surrounding sound;
perform filtering process with the use of one or more filter coefficients on the sound signal and generate a pseudo echo signal;
remove a sound component from the echo signal by subtracting the pseudo echo signal from the echo signal to generate a residual signal;
update the one or more filter coefficients based on the residual signal and the sound signal; and
control the resolution at which the adaptive digital filter is one or more filter coefficients are updated by the updating unit,
  wherein the one or more processors are operable to generate the pseudo echo signal by performing the filtering process on the sound signal with the use of the updated one or more filter coefficients when execution of the second sound processing which is different from the first sound processing is instructed during the execution of the first sound processing, and
  wherein reproduction control, volume control, or tonal control for the sound signal is performed based on the residual signal as the second sound processing.

20. The sound processing apparatus according to claim 19, wherein the resolution is increased or decreased based on the degree of similarity between the pseudo echo signal and the residual signal.

* * * * *